US010706275B2

(12) United States Patent
Wickett et al.

(10) Patent No.: US 10,706,275 B2
(45) Date of Patent: Jul. 7, 2020

(54) SYSTEM AND METHOD FOR STIPULATION COLLECTION USING A SHORT MESSAGE SERVICE (SMS) AND MOBILE DEVICE CAMERAS WITH REAL-TIME ANALYSIS OF DOCUMENTS

(71) Applicant: Informed, Inc., San Francisco, CA (US)

(72) Inventors: Justin Wickett, San Francisco, CA (US); Sandip Agrawal, San Francisco, CA (US)

(73) Assignee: INFORMED, INC., San Francisco, CA (US)

( * ) Notice: Subject to any disclaimer, the term of this patent is extended or adjusted under 35 U.S.C. 154(b) by 88 days.

(21) Appl. No.: 16/154,329

(22) Filed: Oct. 8, 2018

(65) Prior Publication Data
US 2019/0340428 A1 Nov. 7, 2019

Related U.S. Application Data

(60) Provisional application No. 62/666,021, filed on May 2, 2018.

(51) Int. Cl.
*G06K 9/00* (2006.01)
*H04L 12/58* (2006.01)
*G06Q 50/18* (2012.01)

(52) U.S. Cl.
CPC ..... *G06K 9/00449* (2013.01); *G06K 9/00456* (2013.01); *G06Q 50/18* (2013.01);
(Continued)

(58) Field of Classification Search
CPC ........... G06K 9/00449; G06K 9/00456; G06K 2209/01; G06K 9/2072; G06K 9/00469;
(Continued)

(56) References Cited

U.S. PATENT DOCUMENTS 8,015,087 B2 9/2011 Grove
8,392,294 B2 3/2013 MacInnis
(Continued)

FOREIGN PATENT DOCUMENTS

WO 2010134534 A1 11/2010

*Primary Examiner* — Dhaval V Patel
(74) *Attorney, Agent, or Firm* — Jim H. Salter; Inventive Law Inc.

(57) ABSTRACT

A system and method for stipulation collection using a Short Message Service (SMS) and mobile device cameras with real-time analysis of documents is disclosed. A particular embodiment is configured to: establish, by use of a data processor and a data network, a data connection with at least one dealer/lender platform and at least one applicant platform; receive a transaction application corresponding to a transaction for a particular applicant from the dealer/lender platform via the data network, the transaction application identifying a list of stipulation documents required from the particular applicant at the applicant platform; generate a link to the transaction application received from the dealer/lender platform and send the link to the dealer/lender platform; transmit the transaction application with the list of required stipulation documents as a Short Message Service (SMS) message to a mobile device of the particular applicant at the applicant platform; receive an upload of the required stipulation documents from the applicant platform via the data network, the uploaded stipulation documents including at least one stipulation document image captured with a camera of the mobile device of the particular applicant; perform stipulation document analysis and verification operations on the uploaded stipulation documents, the analysis and verification operations including optical character recognition and the application of one or more machine learning models; transmit at least one link of a verified stipulation document to the dealer/lender platform; and transmit an error message
(Continued)

to the particular applicant at the applicant platform if a stipulation document cannot be verified.

20 Claims, 25 Drawing Sheets

(52) U.S. Cl.
CPC .............. *H04L 51/04* (2013.01); *H04L 51/10* (2013.01); *H04L 51/24* (2013.01); *H04L 51/26* (2013.01); *G06K 2209/01* (2013.01)

(58) Field of Classification Search
CPC ......... H04L 51/26; H04L 51/24; H04L 51/10; H04L 51/04; G06Q 50/18
See application file for complete search history.

(56) References Cited

U.S. PATENT DOCUMENTS

| | | |
|---|---|---|
| 9,053,504 B2 | 6/2015 | Taylor |
| 9,280,786 B2 * | 3/2016 | Moissinac .............. G06Q 30/02 |
| 2007/0185777 A1 | 8/2007 | Pyle |
| 2009/0157522 A1 | 6/2009 | Srinivasan |
| 2010/0161408 A1 | 6/2010 | Karson |
| 2012/0284087 A1 | 11/2012 | Pollak |
| 2012/0284113 A1 | 11/2012 | Pollak |
| 2012/0323822 A1 | 12/2012 | Wei |
| 2013/0124360 A1 | 5/2013 | Mitrovic |
| 2014/0052327 A1 | 2/2014 | Hosein |
| 2014/0052745 A1 | 2/2014 | Hosein |
| 2014/0067614 A1 | 3/2014 | Hygema |
| 2014/0279275 A1 | 9/2014 | Burgiss |
| 2016/0042408 A1 | 2/2016 | Tobin |
| 2016/0092950 A1 * | 3/2016 | Driscoll ............. G06Q 30/0633 705/26.8 |

\* cited by examiner

Fig. 8

Dealers can request stipulations from Borrowers via SMS using a link that Lenders can easily have added to their DealerTrack or RouteOne callbacks.

Borrowers receive a SMS sent by either the Dealer or the Lender prompting them to upload missing or incomplete documents needed to satisfy stipulations.

Borrowers tap the link to find out more about which documents they need to provide so that their auto loan can be finalized.

... or Borrowers can upload their photo ID, which is programmatically analyzed according to the Lender's policies & procedures and submitted to the Lender

After Borrowers upload all missing/incomplete docs, they are told that their dealer is working to finalize their vehicle purchase.

Dealers are able to access the stipulations uploaded by their Borrowers via links provided through DealerTrack or RouteOne.

SYSTEM AND METHOD FOR STIPULATION COLLECTION USING A SHORT MESSAGE SERVICE (SMS) AND MOBILE DEVICE CAMERAS WITH REAL-TIME ANALYSIS OF DOCUMENTS

PRIORITY PATENT APPLICATION

This non-provisional patent application draws priority from U.S. provisional patent application Ser. No. 62/666,021; filed May 2, 2018. This present non-provisional patent application draws priority from the referenced patent application. The entire disclosure of the referenced patent application is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017-2018 Informed, Inc., All Rights Reserved.

TECHNICAL FIELD

This patent application relates to computer-implemented software systems, according to one embodiment, and more specifically to a system and method for stipulation collection using a Short Message Service (SMS) and mobile device cameras with real-time analysis of documents.

BACKGROUND

In today's indirect auto lending industry, dealers maintain lists of "contracts in transit", which are contracts that have been assigned to a lender who has not yet paid the dealer. Often times, a dealer's list of contracts in transit grows because of a missing or incomplete document supporting the contract, such as a proof of identity, income, residence, insurance, title, paperwork, etc. that prevents the lender from purchasing the contract from the dealer. Lenders say that dealers will often fax in or email via an unsecured channel these one-off documents days after the contract was initially received. Processing these faxed in or emailed "trailing docs" is operationally inefficient for the lender. In most cases, the lender must figure out to which application the document is related, classify the document, scan the document to store a digital image for audits, key in the information off of the document, and analyze the document according to their written policies and procedures.

Direct auto lending, and direct lending in general, is not much better. Loan officers call applicants who apply for credit online, over the phone, or via fax to inform them of the documents required to clear stipulations. Primary applicants and co-applicants have to submit stipulations via fax, email, or upload them using their desktop computer for manual review by the loan officer. Depending on the loan officer's availability, it may take days for the applicants to receive feedback on whether their documents satisfy the lender's stipulations.

In today's world of indirect auto lending, dealers use software products such as DealerTrack™, RouteOne™, and CUDL™ to submit loan applications on behalf of primary and co-applicants to lenders. Lenders respond with adverse actions or conditional approvals, many of which require certain stipulations to be met pertaining to specific documents before they will purchase the contract from the dealer. When a dealer receives a conditional approval requiring stipulations via DealerTrack™, RouteOne™, or CUDL™, the dealer currently does not have a process that enables them to select which of the documents pertaining to the lender's stipulations they want to ask the primary applicant, the co-applicant, and/or their own personnel to snap pictures of using a phone's camera and get instant feedback on whether the images will help satisfy a stipulation.

SUMMARY

In various example embodiments described herein, a system and method for stipulation collection using SMS and mobile device cameras with real-time analysis of documents is disclosed. In the various example embodiments described herein, a computer-implemented tool or software application (app) as part of a stipulation facilitation system is described to automate and improve the collection and verification of stipulations between parties in a transaction. As described in more detail below, a computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, consumer electronic devices, or any other type of computing, data processing, communication, networking, or electronic system.

In various example embodiments described herein, the stipulation facilitation system provides a series of processes to help dealers and/or lenders collect and verify documents pertaining to stipulations from primary applicants, co-applicants, their own personnel, and/or other parties to a transaction using a Short Message Service (SMS) and mobile device cameras. In an example embodiment, documents are immediately analyzed using machine learning techniques to provide real-time feedback to the applicant, the dealer, and/or the lender who snapped photos of or uploaded documents regarding deficiencies that prevent the stipulation from being satisfied.

In various example embodiments described herein, the stipulation facilitation system provides a document collection and verification system as it relates to the consumer finance industry, specifically, to indirect and direct auto lending. Indirect auto loan applicants and dealer personnel to date have not been able to take advantage of SMS capabilities that allow for secure Web links to be delivered to mobile devices (e.g., mobile phones) so that parties to a transaction can use the cameras on their mobile devices to upload documents and get near real-time feedback on issues that could delay the lender from accepting the document. The same is true in the direct lending space (including auto lending), where applicants are delayed in receiving feedback on documents they submit via fax or email until they are manually reviewed by a lender's loan officer. Occasionally, lenders offer applicants a Web-based portal whereby the applicant can upload the document using a desktop computer. Direct auto lending applicants do not have a process today to upload documents using their mobile phone's camera and instantly receive feedback on discrepancies or deficiencies that could delay their loan's funding or completion of a related transaction.

BRIEF DESCRIPTION OF THE DRAWINGS

The various embodiments are illustrated by way of example, and not by way of limitation, in the figures of the accompanying drawings in which:

FIG. 8 illustrates an example of the presence of consent and/or waiver language in a credit application;

DETAILED DESCRIPTION

Figure 1:
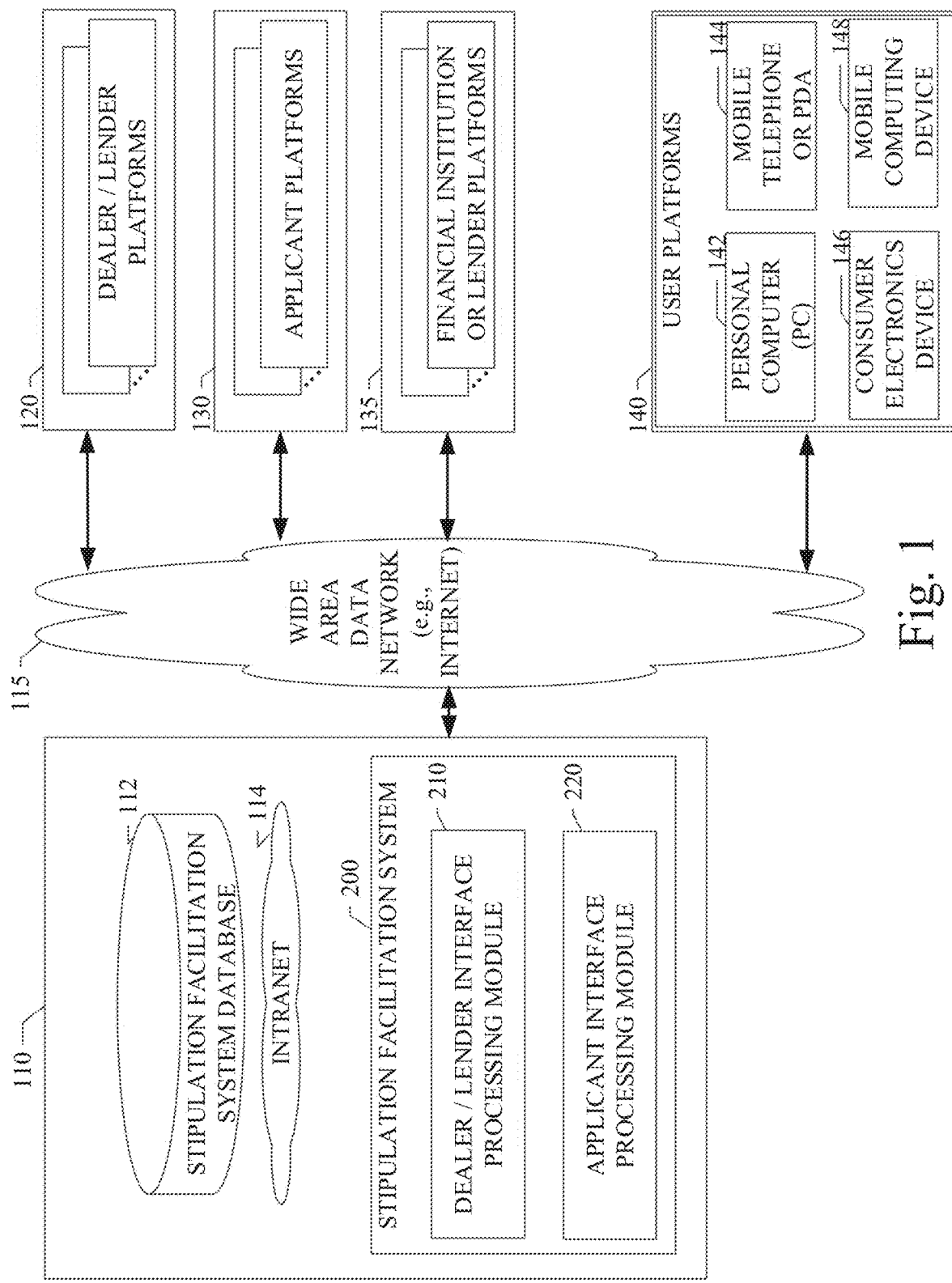
FIG. 1 illustrates an example embodiment of a networked system in which various embodiments may operate.

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments described herein, a system and method for stipulation collection using SMS and mobile device cameras with real-time analysis of documents is disclosed. In the various example embodiments described herein, a computer-implemented tool or software application (app) as part of a stipulation facilitation system is described to automate and improve the collection and verification of stipulations between parties in a transaction. As described in more detail below, a computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, consumer electronic devices, or any other type of computing, data processing, communication, networking, or electronic system.

In various example embodiments described herein, the stipulation facilitation system provides a series of processes to help dealers and/or lenders collect and verify documents pertaining to stipulations from primary applicants, co-applicants, their own personnel, and/or other parties to a transaction using a Short Message Service (SMS) and mobile device cameras. In an example embodiment, documents are immediately analyzed using machine learning techniques to provide real-time feedback to the applicant who snapped photos of or uploaded documents regarding deficiencies that prevent the stipulation from being satisfied.

In various example embodiments described herein, the stipulation facilitation system provides a document collection and verification system as it relates to the consumer finance industry, specifically, to indirect and direct auto lending. The various example embodiments described herein enable indirect auto loan applicants and dealer personnel to take advantage of SMS capabilities that allow for secure Web links to be delivered to mobile devices (e.g., mobile phones) so that parties to a transaction can use the cameras on their mobile devices to upload documents and get near real-time feedback on issues that could delay the lender from accepting the document. The various example embodiments described herein also support the direct lending space (including auto lending), where applicants are not delayed in receiving feedback on documents they submit to a lender's loan officer. The various example embodiments described herein enable direct auto lending applicants to upload documents using their mobile phone's camera and instantly receive feedback on discrepancies or deficiencies that could delay their loan's funding or completion of a related transaction. Details of the various example embodiments are described in more detail below.

FIG. 1, in an example embodiment, illustrates a system and method for stipulation collection using a Short Message Service (SMS) and mobile device cameras with real-time analysis of documents. In various example embodiments, an application or service, typically provided by or operating on a host site (e.g., a website) 110, is provided to simplify and facilitate the downloading or hosted use of the stipulation facilitation system 200 of an example embodiment. In a particular embodiment, the stipulation facilitation system 200 can be downloaded from the host site 110 by a user at a user platform 140. Alternatively, the stipulation facilitation system 200 can be hosted by the host site 110 for a networked user at a user platform 140. The details of the stipulation facilitation system 200 for an example embodiment are provided below.

Referring again to FIG. 1, the stipulation facilitation system 200 can be in network communication with a plurality of dealer/lender platforms 120 and/or applicant platforms 130. The dealer/lender platforms 120 can include user platform computing and/or communication devices, websites, or other network resources at which product sellers or brokers operate or at which information regarding sellers and products (e.g., vehicles) offered for sale is available. In some cases, seller/brokers operating at the dealer/lender platforms 120 can have their own finance departments from which loan applications or credit applications for customers or consumers can be processed. The stipulation facilitation system 200 can be configured to provide data communications for the user platforms serving as networked platforms for product sellers/brokers and to obtain seller information, product information, and consumer information in a digital or computer-readable form via the network 115. The applicant platforms 130 can include user platform computing and/or communication devices configured to serve as networked platforms for product consumers (e.g., potential product buyers) and to obtain consumer information including, consumer financing information, consumer characteristics, consumer activities, consumer product interests, or other consumer information. The stipulation facilitation system 200 can be configured to obtain this consumer information in a digital or computer-readable form via the network 115. The stipulation facilitation system 200 can also be in network data communication with a plurality of other information sites, such as consumer data or credit reporting platforms, and/or product valuation or rating sites. These types of on-line consumer data or credit reporting sites and product valuation or rating sites are well known to those of ordinary skill in the art.

The stipulation facilitation system 200 can also be in network data communication with a plurality of on-line financial institution or lender sites 135. The stipulation facilitation system 200 be configured to provide data communications for the user platforms or websites serving as networked platforms for on-line financial institutions or lenders and to obtain potential consumer-related financing, loan, or credit information in a digital or computer-readable form from one or more of the on-line financial institution or lender platforms 135 via the network 115. The stipulation facilitation system 200 be also be configured to provide data communications for the on-line financial institution or lender platforms 135 to enable the networked usage, transfer, or downloading of a dealer/lender interface processing module 210. The dealer/lender interface processing module 210 may initially reside with a financial institution or lender 135 or may be downloaded to or from the host site 110. In other words, the dealer/lender interface processing module 210 may be used, transferred, or downloaded to the host site 110 and the stipulation facilitation system 200 therein via the network 115. As such, the dealer/lender interface processing module 210 may be hosted by the host site 110 or locally resident and locally used by a dealer or lender at dealer/lender platform 120 and/or a consumer at an applicant platform 130.

One or more of the dealer/lender platforms 120, the applicant platforms 130, and the on-line financial institution or lender sites 135 can be provided by one or more third party providers operating at various locations in a network ecosystem. It will be apparent to those of ordinary skill in the art that dealer/lender platforms 120 or applicant platforms 130 can include or be any of a variety of networked third party information providers or on-line vendors or merchants as described in more detail below. In a particular embodiment, a resource list maintained at the host site 110 can be used as a summary or list of all dealer/lender platforms 120, applicant platforms 130, and on-line financial institution or lender sites 135, which users or the host site 110 may visit/access and from which users or the host site 110 can obtain seller data, product data, consumer data, or consumer financial or credit information. The host site 110, dealer/lender platforms 120, applicant platforms 130, on-line financial institution or lender sites 135, and user platforms 140 may communicate and transfer data and information in the data network ecosystem shown in FIG. 1 via a wide area data network (e.g., the Internet) 115. Various components of the host site 110 can also communicate internally via a conventional intranet or local area network (LAN) 114.

Networks 115 and 114 are configured to couple one computing device with another computing device. Networks 115 and 114 may be enabled to employ any form of computer readable media for communicating information from one electronic device to another. Network 115 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

Networks 115 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 115 and 114 may also include an autonomous system of terminals, gateways, routers, and the like connected by wireless radio links or wireless transceivers. These connectors may be configured to move freely and randomly and organize themselves arbitrarily, such that the topology of networks 115 and 114 may change rapidly and arbitrarily.

Networks 115 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, networks 115 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 115 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 115 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The dealer/lender platforms 120, applicant platforms 130, and/or the on-line financial institution or lender sites 135 may include any of a variety of providers of network transportable digital data. The network transportable digital data can be transported in any of a family of file formats and associated mechanisms usable to enable a host site 110 and a user platform 140 to receive seller or product data from a dealer/lender platform 120, to receive consumer data from an applicant platform 130, and/or to receive buyer financing or credit information from an on-line financial institution or lender sites 135 over the network 115. In one embodiment, the file format can be a Microsoft™ Excel spreadsheet format or a CSV (Comma Separated Values) format; however, the various embodiments are not so limited, and other file formats and transport protocols may be used. For example, data formats other than Excel or CSV or formats other than open/standard formats can be supported by various embodiments. Any electronic file format, such as Microsoft™ Access Database Format (MDB), Portable Document Format (PDF), audio (e.g., Motion Picture Experts Group Audio Layer 3-MP3, and the like), video (e.g., MP4, and the like), and any proprietary interchange format defined by specific sites can be supported by the various embodiments described herein. Moreover, a dealer/lender platform 120, an applicant platform 130, and/or an on-line financial institution or lender sites 135 may provide a variety of different data sets or computational modules.

In a particular embodiment, a user platform 140 with one or more client devices enables a user to access data provided by the stipulation facilitation system 200 via the host 110 and network 115. Client devices of user platform 140 may include virtually any computing device that is configured to send and receive information over a network, such as network 115. Such client devices may include portable devices 144, such as, cellular telephones, smart phones, camera phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. The client devices may also include other computing devices, such as personal computers 142, multi-processor systems, microprocessor-based or programmable consumer electronics, network PC's, and the like. The client devices may also include other processing devices, such as consumer electronic (CE) devices 146 and/or mobile computing devices 148, which are known to those of ordinary skill in the art. As such, the client devices of user platform 140 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a full screen color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with applications (apps) with which the functionality described herein can be implemented.

The client devices of user platform 140 may also include at least one client application that is configured to receive product data, consumer data, financing data, and/or control data from another computing device via a wired or wireless network transmission. The client application may include a capability to provide and receive textual data, graphical data, video data, audio data, and the like. Moreover, client devices of user platform 140 may be further configured to communicate and/or receive a message, such as through a Short Message Service (SMS), direct messaging (e.g., Twitter™), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Referring again to FIG. 1, the stipulation facilitation system 200 for an example embodiment is shown to include a stipulation facilitation system database 112. The database 112 can be used to retain a variety of information data sets including, but not limited to, seller information, product or product listing information, consumer information, buyer financing or credit information, loan information, targeted buyer group or custom audience information, advertisement (ad) data, buyer/seller/product analytics, and the like. It will be apparent to those of ordinary skill in the art that the stipulation facilitation system database 112 can be locally resident at the host site 110 or remotely located at other server locations or stored in network cloud storage.

Referring again to FIG. 1, host site 110 of an example embodiment is shown to include the stipulation facilitation system 200. In an example embodiment, stipulation facilitation system 200 can include a dealer/lender interface processing module 210, and an applicant interface processing module 220. Each of these modules can be implemented as software components executing within an executable environment of stipulation facilitation system 200 operating on host site 110 or user platform 140. Each of these modules of an example embodiment is described in more detail below in connection with the figures provided herein.

Referring still to FIG. 1, the stipulation facilitation system 200 can include a dealer/lender interface processing module 210 and an applicant interface processing module 220. The dealer/lender interface processing module 210 can facilitate communication and the transfer of data and documents between a user at a dealer/lender platform 120 and the host site 110. The applicant interface processing module 220 can facilitate communication and the transfer of data and documents between a user at an applicant platform 130 and the host site 110. The dealer/lender interface processing module 210 and the applicant interface processing module 220 can be configured to perform the processing as described in more detail below. The dealer/lender interface processing module 210 can be resident at the host site 110, resident on a dealer/lender platform 120, or partially resident on a plurality of user platforms 140. Similarly, the applicant interface processing module 220 can be resident at the host site 110, resident on an applicant platform 130, or partially resident on a plurality of user platforms 140. The stipulation facilitation system 200 be configured to provide data communications for the dealer/lender platforms 120 and the applicant platforms 130 to enable the networked usage, transfer, or downloading of information, requests, images, documents, and related data to facilitate the gathering and validation of stipulations related to a seller/consumer transaction. The components and processes for the gathering and validation of stipulations related to a seller/consumer transaction as embodied in the dealer/lender interface processing module 210 and the applicant interface processing module 220 are described in more detail below.

Figure 2:
FIG. 2 illustrates a sample screenshot in an example embodiment on a computing device of a dealer/lender platform showing how dealers in the example embodiment can initiate this process of requesting stipulation documentation from an applicant.

Referring now to FIG. 2, an example embodiment provides a system and method that allows dealers and/or lenders to use the dealer/lender interface processing module 210 via a dealer/lender platform 120 to initiate a process whereby a primary applicant, a co-applicant, and/or their own personnel can use the applicant interface processing module 220 via an applicant platform 130 to capture pictures or images of documents using a mobile device camera of the applicant platform 130 and receive instant feedback on whether the images will help to satisfy a stipulation related to a transaction. FIG. 2 illustrates a sample screenshot in an example embodiment on a computing device of a dealer/lender platform 120 showing how dealers in the example embodiment can initiate this process of requesting stipulation documentation from an applicant. In the example shown, the applicant can be asked, via an applicant platform 130, to provide several stipulation documents, including, among others, a credit application, proof of insurance, driver license, proof of residence, proof of income, and/or references, etc. The example embodiments described herein improve the existing technologies by allowing these stipulation documents to be imaged by an applicant via a mobile device camera of an applicant platform 130. The stipulation document images can then be automatically and securely sent electronically, via the applicant interface processing module 220, to dealers and/or lenders for immediate processing, thereby eliminating delays, lost documents, and redundant documents. The requested applicant stipulation documents can be received by the dealers and/or lenders via the dealer/lender interface processing module 210 and the dealer/lender platform 120.

Figure 3:
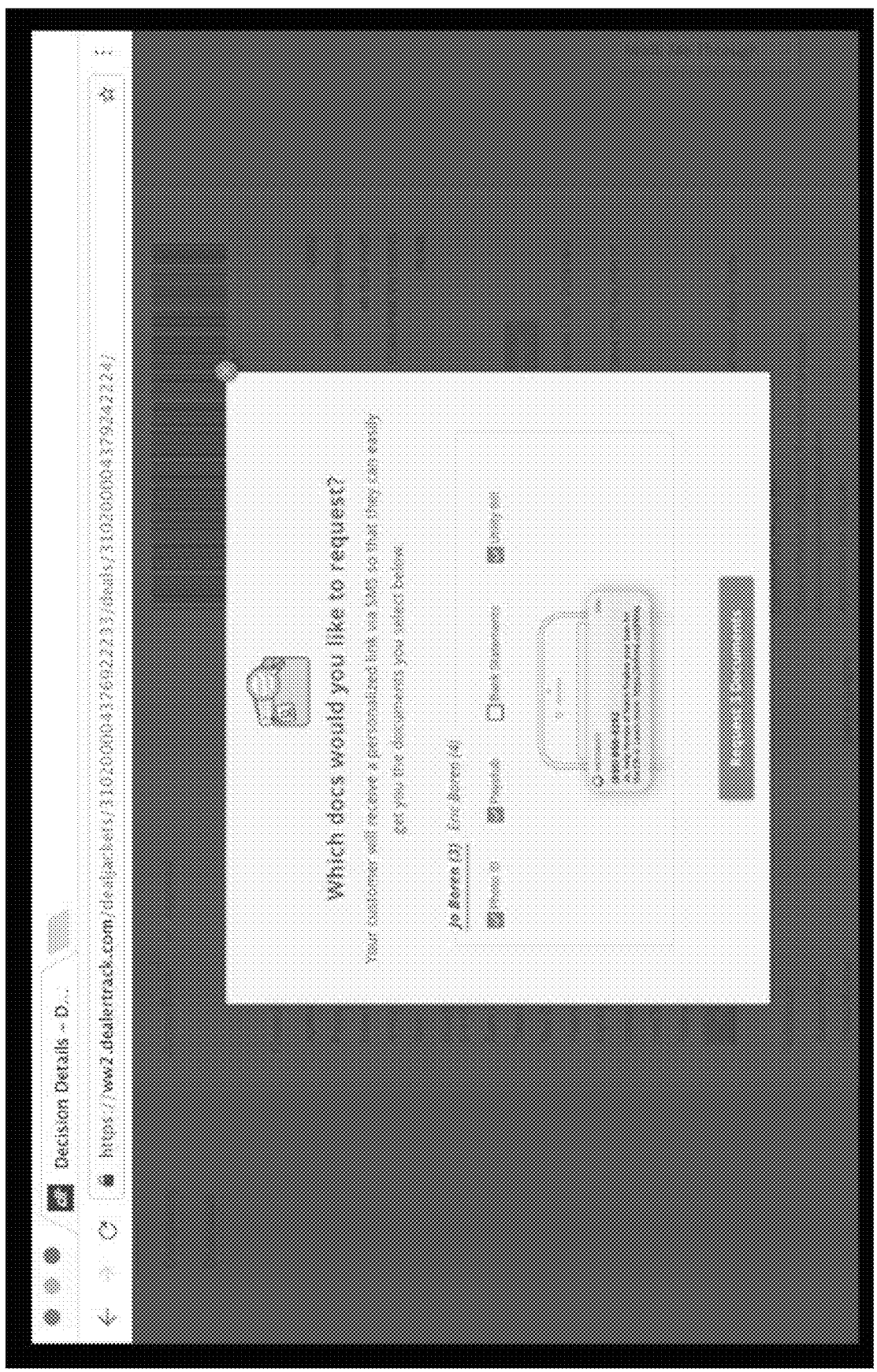
FIG. 3 illustrates a sample screenshot in an example embodiment on a computing device of a dealer/lender platform showing how dealers in the example embodiment can specify different sets of stipulation documents they want to receive from primary applicants, co-applicants, and/or their own personnel.

Referring to FIG. 3, an example embodiment provides a system and method that allows dealers and/or lenders to specify different sets of stipulation documents they want to receive from primary applicants, co-applicants, and/or their own personnel. This feature of the example embodiment enables dealers and/or lenders to specify whether any single stipulation document from a set of stipulation documents pertaining to a transaction stipulation will clear the stipulation or if all documents pertaining to a stipulation are required. This feature of the example embodiment improves the technology by allowing dealers and/or lenders to not request documents they already have. This serves to reduce network traffic and eliminate unnecessary electronic document transfers.

Figure 4:
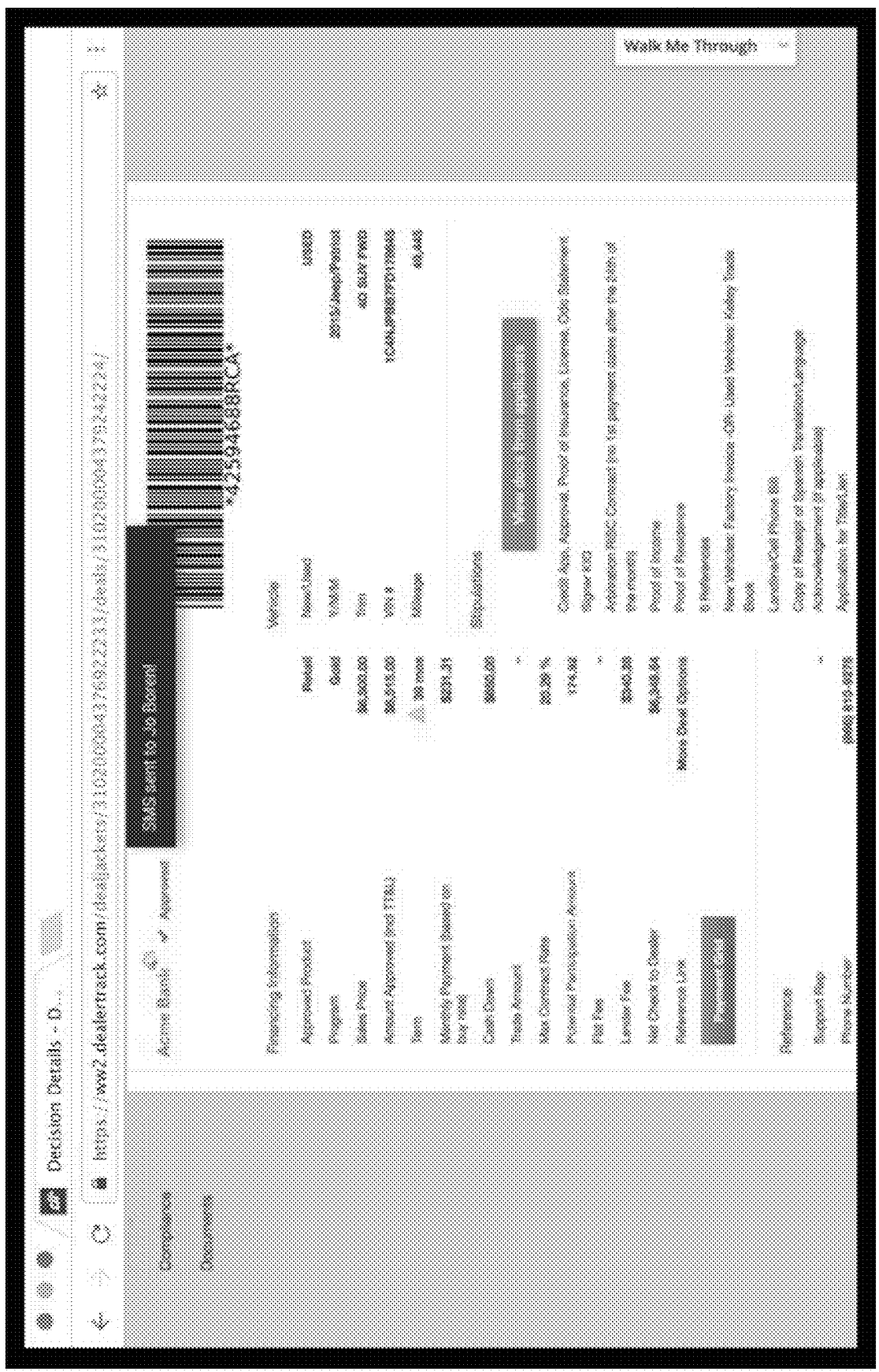
FIG. 4 illustrates a sample screenshot in an example embodiment on a computing device of a dealer/lender platform showing how a dealer/lender in the example embodiment can receive confirmation of their intent to send a SMS message to applicants, the SMS message requesting that the applicant capture images of documents needed to satisfy stipulations.

FIG. 4 illustrates a sample screenshot in an example embodiment on a computing device of a dealer/lender platform 120 showing how a dealer/lender in the example embodiment can receive confirmation of their intent to send a SMS message to applicants, the SMS message requesting that the applicant capture images of documents needed to satisfy stipulations. Referring to FIG. 4, an example embodiment provides a system and method that allows the dealer and/or lender, via the dealer/lender interface processing module 210 and the dealer/lender platform 120, to preview the contents of the SMS text messages that can be sent out to the primary applicant, the co-applicant, and/or their own personnel before the SMS text messages are sent out. This feature of the example embodiment improves the technology by enabling the dealer and/or the lender to preview the phone number from which the SMS text message will be sent to the applicant, the time when the message will be received, the message's body (which may contain personalized content for the recipient), and how the message might appear on the recipient's phone or computer of the applicant platform 130. This feature of the example embodiment also enables the dealer/lender to request that the SMS be sent after it is previewed.

Figure 5:
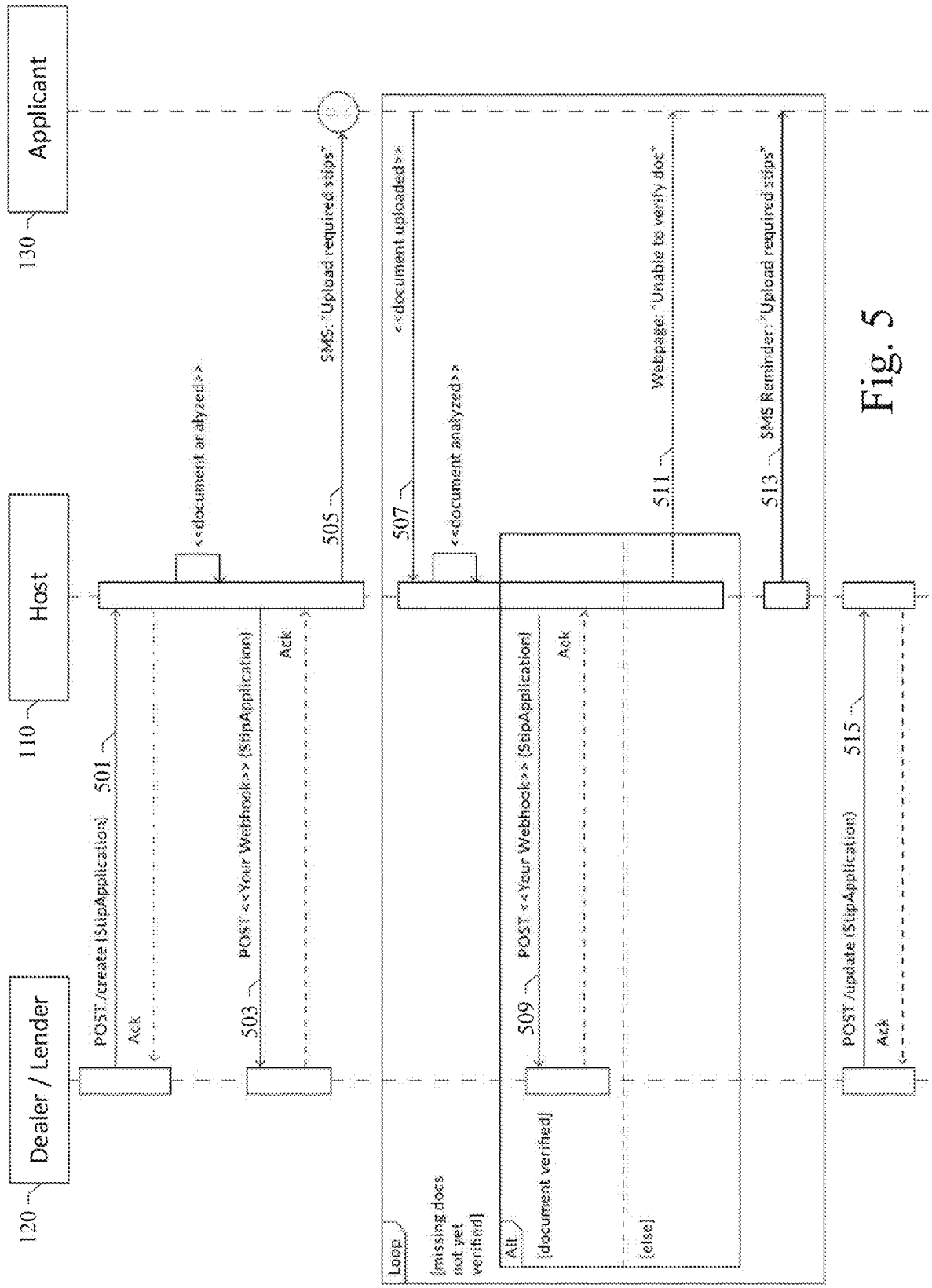
FIG. 5 illustrates a sequence diagram showing a series of operations for the exchange of data in an example embodiment.

Referring to FIG. 5, an example embodiment provides a system and method that allows the dealer and/or lender at a dealer/lender platform 120 to securely transfer data and documents between their computer (or computer systems that the dealer and/or lender contracts with) and the host site 110, which can be a third-parry's cloud-based computing cluster. This secure data transfer capability can be implemented and controlled by the dealer/lender interface processing module 210. This secure data transfer capability enables the dealer and/or lender to share: (i) documents previously collected that need analysis to determine whether they satisfy stipulations, (ii) missing documents that still need to be collected to satisfy stipulations, and (iii) information commonly found in a credit application, including, but not limited to, information pertaining to the primary applicant, the co-applicant (if any), the collateral being financed, any collateral being traded-in, and the terms of the loan/lease requested. This data transfer may take place using protocols such as HTTP, FTP, SMTP, etc., whereby information, that may be encrypted using SSL/TLS, is exchanged in a variety of formats (including, but not limited to, XML and JSON formats). The indirect and direct auto lending samples described herein show how a dealer and/or lender can share data with the host site 110 specifying which documents require analysis or collection along with supplying information commonly found in a credit application. A sequence diagram showing a series of operations for the exchange of data in an example embodiment is shown in FIG. 5.

Referring still to FIG. 5, a dealer/lender can use a dealer/lender platform 120 at operation 501 to generate a transaction application for a particular applicant. The application can include a list of stipulation documents required from the applicant. The generated transaction application can be electronically transferred to the host site 110, and the stipulation facilitation system 200 therein, via the dealer/lender interface processing module 210. In an example embodiment, an HTTP POST can be used to transfer the transaction application to the host site 110. The host site 110 can validate the transaction application for the particular applicant received from the dealer/lender platform 120. The host site 110 can also parse the transaction application to identify the list of stipulation documents required from the applicant. At operation 503, the host site 110, and the stipulation facilitation system 200 therein, can respond to the dealer/lender with an HTTP webhook, a link, or unique identifier of the validated transaction application received from the dealer/lender. At operation 505, the host site 110, and the stipulation facilitation system 200 therein, can also electronically transmit the list of required stipulation documents to the particular applicant at a corresponding applicant platform 130. The applicant interface processing module 220 can be used to transmit the validated transaction application with the list of required stipulation documents to the particular applicant. In the example embodiment, the list of required stipulation documents can be transmitted to the particular applicant as one or more SMS messages, which can be received by the applicant via a mobile device of the applicant platform 130. This feature of the example embodiment improves the technology by enabling the particular applicant to interact with the dealer/lender using a convenient mobile device, instead of a desktop computer or other less convenient platform. At operation 507, the applicant can upload the stipulation documents identified in the list of required stipulation documents to the host site 110. The stipulation documents can be imaged by the applicant using a camera of the applicant's mobile device. This feature of the example embodiment improves the technology by enabling the particular applicant to produce electronically transferrable stipulation documents using a convenient mobile device camera, instead of having to attach documents to an email or use postal mail. Once the stipulation documents, or a portion thereof, are uploaded to the host site 110 by the applicant in response to the SMS message, the host site 110 can perform a set of document analysis and validation operations on the uploaded documents to, for example: check for document type, format, corruption, malware, and association with the particular applicant; determine compliance between the requested documents and the received documents; and identify any requested documents that were not received. Additional stipulation document analysis and verification techniques used in an example embodiment are described in more detail below. At operation 509, if the host site 110 is able to verify one or more of the uploaded stipulation documents, a link to each verified stipulation document, or a single link to a group of verified stipulation documents, can be sent to the dealer/lender at the dealer/lender platform 120 with an HTTP webhook, a link, or unique identifier of the validated stipulation document(s) received from the applicant. The dealer/lender interface processing module 210 at the dealer/lender platform 120 can receive the validated stipulation document link(s) from the host site 110. The dealer/lender interface processing module 210 can use the link(s) to fetch the validated stipulation document(s) and associate the received stipulation documents with the transaction application generated for the particular applicant. The dealer/lender interface processing module 210 can also send an acknowledgement back to the host site 110 indicating that the verified stipulation document(s) have been received.

At operation 511, if the host site 110 is unable to verify one or more of the uploaded stipulation documents, the host site 110 can update a webpage on the user interface of the applicant platform 130 to indicate that one or more of the uploaded stipulation documents were invalid or non-verifiable. In an alternative embodiment, an SMS message can be sent by the host site 110 to the applicant via a mobile device of the applicant platform 130 to indicate that one or more of the uploaded stipulation documents were invalid or non-verifiable. As shown in FIG. 5, a loop from operation 507 through operation 511 as described above can be repeated until all of the requested stipulation documents for an applicant's transaction application have been received from the applicant and all documents have been verified by the host site 110. At operation 513, the host site 110 can periodically send reminders to the particular applicant as one or more SMS messages, which can be received by the applicant via a mobile device of the applicant platform 130. The reminders are used to prompt the applicant to upload the requested stipulation documents for the applicant's transaction application. At operation 515, the dealer/lender can use a dealer/lender platform 120 to update a transaction application for a particular applicant. The updated transaction application can be electronically transferred to the host site 110, and the stipulation facilitation system 200 therein, via the dealer/lender interface processing module 210. In a manner similar to the operations described above, the host site 110 can validate the updated transaction application for the particular applicant received from the dealer/lender platform 120. The host site 110 can parse the updated transaction application to identify any additional stipulation documents required from the applicant. Using operations 505 through 513 as described above, the host site 110 can prompt the applicant to upload the additionally requested stipulation documents for the updated transaction application. As a result, the dealer/lender at a dealer/lender platform 120 can use host site 110, and the stipulation facilitation system 200 therein, to request and obtain verified stipulation documents for a transaction from a particular applicant using a completely automated and network enabled process. These features of the example embodiments improve the technology by substantially increasing the speed and accuracy by which verified stipulation documents can be obtained from an applicant with electronic means. This serves to enable the completion of transactions between the dealer/lender and the applicant in a much more efficient manner.

Figure 6:
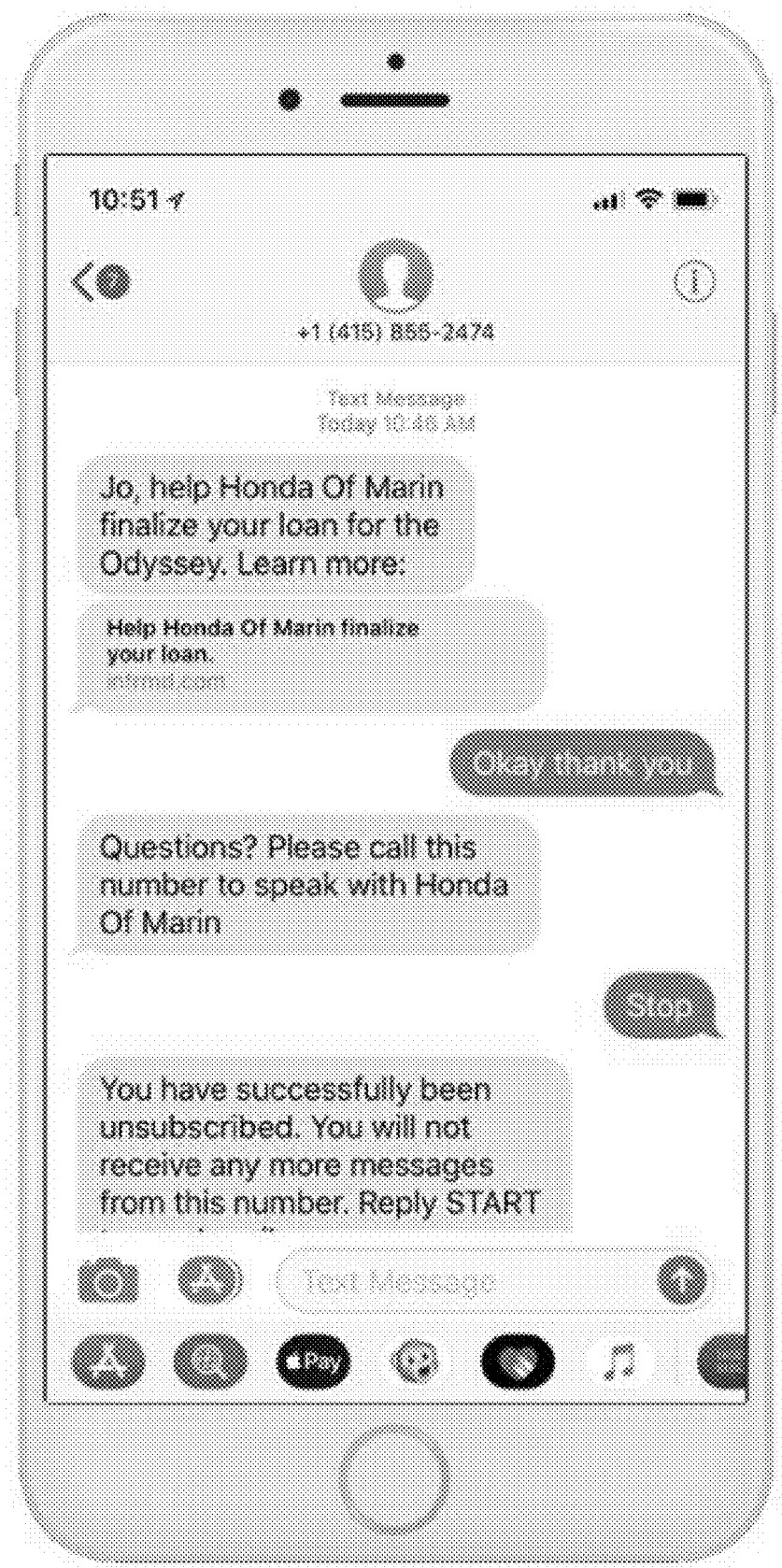
FIG. 6 illustrates an example screenshot of an applicant's mobile device of a corresponding applicant platform showing an example embodiment that provides a system and method to ensure that SMS recipients only receive text messages initiated by dealers and/or lenders at certain hours of the day as defined in terms of the SMS recipient's local time.

Referring to FIG. 6, an example screenshot of an applicant's mobile device of a corresponding applicant platform 130 illustrates an example embodiment that provides a system and method to ensure that SMS recipients only receive text messages initiated by dealers and/or lenders at certain hours of the day as defined in terms of the SMS recipient's local time. This method enables dealers and/or lenders to re-send SMS messages via host site 110 to applicant platforms 130 without exceeding a pre-defined cadence to applicants who are: 1) unresponsive, or 2) requested to provide a different set of stipulation documents or the same set of stipulation documents under different terms. This method enables dealers and/or lenders to limit the number of SMS messages that an applicant may receive. In addition, this method enables applicants to eliminate or reduce the receipt of SMS message by requesting that dealers and/or lenders stop sending SMS messages to an applicant should the applicant demonstrate an intent of opting-out of receiving future SMS messages (such as replying to a received SMS message with the keywords STOP, END, etc.). Furthermore, this method enables dealers and/or lenders to automatically respond when a SMS recipient sends a text message response back that is not indicative of an opt-out. Finally, this method enables dealers and/or lenders to re-route calls initiated to the phone number that generated the SMS to their call processing centers or terminated according to pre-defined rules. FIG. 6 also shows that the recipient of the text message can opt-out of receiving future text messages in accordance with the Telephone Consumer Protection Act (TCPA). Furthermore, FIG. 6 shows that responding to the text message prompts the recipient to contact either the dealer and/or the lender for more information. FIG. 6 also shows that if the SMS recipient were to call the phone number from which they received the SMS, their call would be redirected to either the dealer or the lender.

Figure 7:
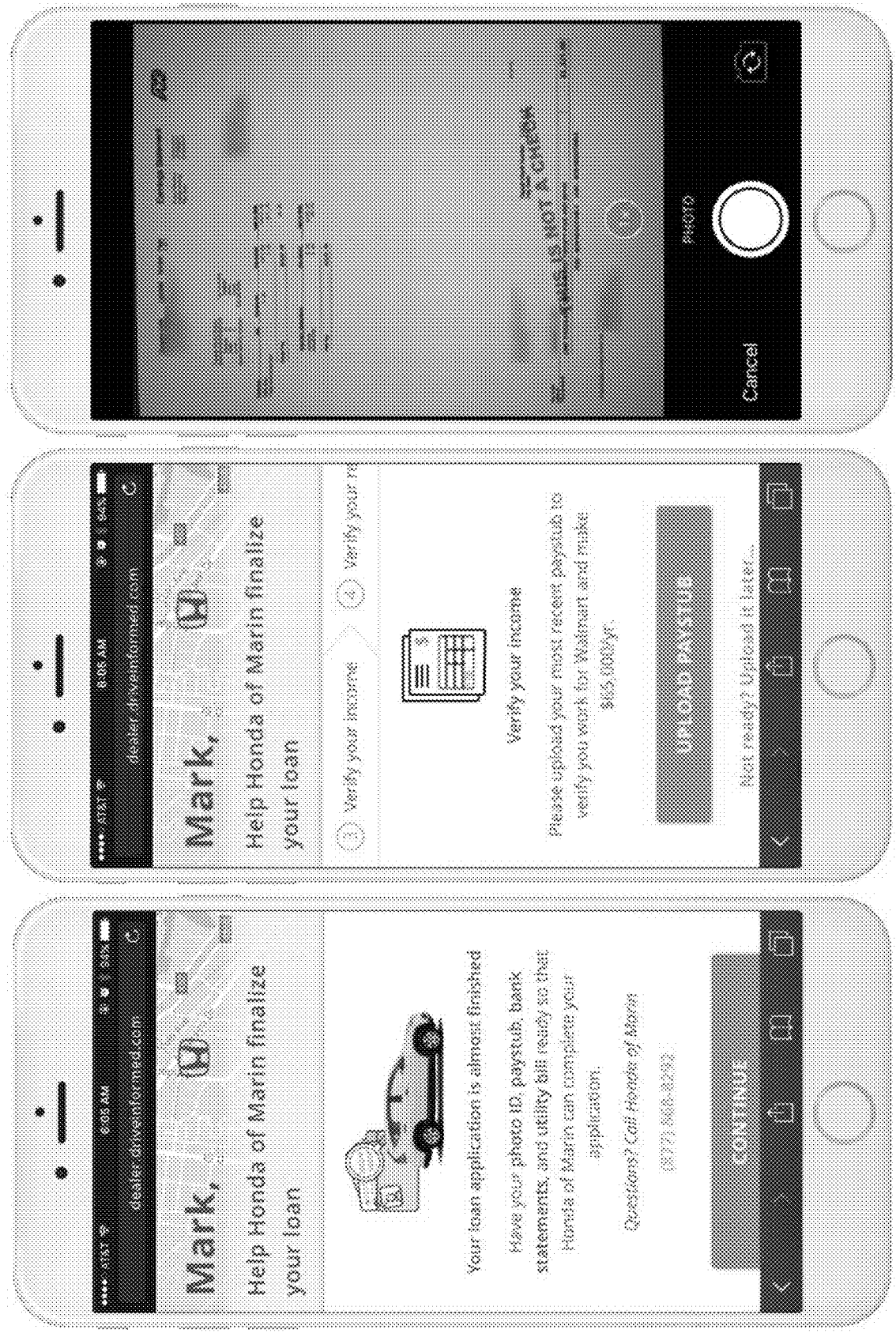
FIG. 7 illustrates an example embodiment whereby an applicant receiving a personalized link on behalf of a dealer and/or lender may open the personalized link using their the web browser of their mobile device to satisfy a request for stipulation documents.

Referring to FIG. 7, an example embodiment provides a system and method whereby an applicant receiving a personalized link on behalf of a dealer and/or lender may open the personalized link using their the web browser of their mobile device to: 1) see which stipulation documents and/or images the dealer and/or lender is requesting the applicant provide to satisfy stipulations pertaining to their transaction (e.g., a loan application), 2) review the dealer and/or lender's legal notices and consents, 3) verify their identity, 4) use the camera on their mobile device or the file system's browsing capabilities within the web browser of their mobile device to capture or obtain images of the requested stipulation documents, and 5) upload the stipulation documents/images requested by the dealer and/or lender for access by the dealer and/or lender in completing a transaction. In an example embodiment, the stipulation documents may include, but are not limited to, Government-Issued Photo IDs, Paystubs, Bank Statements, Social Security Income Award Letters, Job Offer Letters, Military Leave and Earnings Statements (LES) and Retiree Account Statements (RAS), Disability Insurance Award Letters, Student Financial Aid, Utility Bills, Insurance Cards, Insurance Declaration Pages, Fronts of State-Issued Vehicle Titles, Backs of State-Issued Vehicle Titles, Fronts of State Issued Vehicle Registration Cards, Powers of Attorney, Agreements to Furnish Insurance Policies, Risk-Based Pricing Notices, Credit Score Disclosure Exception Notices, Retail Installment Sales Contracts, Closed End Motor Vehicle Leases, Authorizations To Release Payoff Information, Acknowledgements Of Rewritten Contracts, Notices To Co-Signers, Applications for Title, Odometer Statements, Buyer's Orders or Lease Orders, Foreign Language Acknowledgements, Factory Invoices, Kelley Blue Book™ Bookout Sheets, NADA™ Bookout Sheets, GAP Waiver Contracts, Vehicle Service Contracts, or Credit Life Disability Insurance Contracts.

An example embodiment provides a system and method whereby images of stipulation documents (uploaded by applicants who receive document request messages on behalf of dealers and/or lenders as described above) are transferred over the network 115 using protocols such as HTTP, FTP, and the like to a cloud-based computing cluster, such as host site 110, where the contents of the uploaded stipulation documents are analyzed using a variety of image processing techniques, including optical character recognition and the application of machine learning models. The host site 110, and the applicant interface processing module 220 therein, can perform image processing operations, such as image map reduction tasks to process the image's pixels in parallel while storing the color of each pixel, the proximity of contrasting colored pixels, and the positions, alignments, and densities of similar-colored pixels. The image processing results can be compared to handwritten and typeface representations of Unicode characters to classify text in the image. In addition to extracting document text, the image's pixels can be compared to patterns often found in documents related to particular transactions (e.g., loans). These patterns can include facial images, electronic or handwritten signatures, rounded corners, watermarks, background designs, barcodes, logos, etc. These patterns can be analyzed using well-known machine learning systems such as convolutional neural nets (CNNs), bi-directional Long Short Term Memory (LSTMs), Connectionist Temporal Classification (CTC), Support Vector Machines (SVMs), etc. to search for commonalities between structured and unstructured data sets. Documents exhibiting similar features can be grouped together and classified by their type (such as Government-Issued Photo IDs, Paystubs, Bank Statements, Social Security Income Award Letters, Job Offer Letters, Military Leave and Earnings Statements (LES) and Retiree Account Statements (RAS), Disability Insurance Award Letters, Student Financial Aid, Utility Bills, Insurance Cards, Insurance Declaration Pages, Fronts of State-Issued Vehicle Titles, Backs of State-Issued Vehicle Titles, Fronts of State Issued Vehicle Registration Cards, Powers of Attorney, Agreements to Furnish Insurance Policies, Risk-Based Pricing Notices, Credit Score Disclosure Exception Notices, Retail Installment Sales Contracts, Closed End Motor Vehicle Leases, Authorizations To Release Payoff Information, Acknowledgements Of Rewritten Contracts, Notices To Co-Signers, Applications for Title, Odometer Statements, Buyer's Orders or Lease Orders, Foreign Language Acknowledgements, Factory Invoices, Kelley Blue Book™ Bookout Sheets, NADA™ Bookout Sheets, GAP Waiver Contracts, Vehicle Service Contracts, or Credit Life Disability Insurance Contracts). Given the document type as determined by the image processing analysis as described above, the structure of the document can be determined by the document type. Based on the document type and structure, text or other structured information can be extracted from the document and then further classified into names, dates, physical addresses, phone numbers, email addresses, identification numbers, organizations, municipalities, currencies, legalese, restrictions, page numbers, document page count, etc. based on the text patterns and features (including formats and layouts) commonly found in these document types. For example, the following sample of a regular expression written in the Ruby™ programming language can be used by an example embodiment to classify text present in a document/image as a currency:

```
/(?-mix:(?-mix:-\s?\[$S\]|\[$S\]|\s?-|\[$S\])(?-mix:(?-mix:\d{1,3}-
(?:,\d{3})*)|(?-mix:\d{1,3}(?:,\d{3})*)|(?-mix:\d+))(?-mix:\.\d{2})?(?-
mix:(?!\S*\d)))|(?-mix:(?-mix:(?-mix:\d{1,3}(?:,\d{3})*)|(?-mix:\d{1,3}-
(?:,\d{3})*)|(?-mix:\d+))(?-mix:\.\d{2})(?-mix:(?!\S*\d)))/
```

Comparatively, the following examples of Ruby™ regular expressions are one of many used by an example embodiment to classify text present in a document/image as a date:

```
MMDDYYYY_REGEX = /([01]?[0-9])[\/-]?([0123]?[0-9])[\/-
]?((?:19|20)[0-9][0-9])\b/
YYYYMMDD_REGEX = /((?:19|20)[0-9][0-9])[\/-]?([01]?[0-9])[\/-
]?([0123]?[0-9])\b/MONTH_REGEX =
/(?:Jan(?:uary)?|Feb(?:ruary)?|Mar(?:ch)?|Apr(?:il)?|May|Jun(?:e)?|-
Jul(?:y)?|Aug(?:ust)?|Sep(?:tember)?|Oct(?:ober)?|Nov(?:ember)?|-
Dec(?:ember))/i
MONTHDDYY_REGEX = /(#{MONTH_REGEX}[,\s]*[0123]?[0-
9][,\s]*(?:19|20)[0-9][0-9])\b/
DDMONTHYY_REGEX = /([0123]?[0-9][,\s]*#{MONTH_REGEX}-
[,\s]*(?:19|20)[0-9][0-9])\b/
MMDDYY_REGEX = /([01]?[0-9])[\/-]([0123]?[0-9])[\/-
]([0-9][0-9])\b/
```

Some features or elements of a document can be classified even further based on information found in the transaction application. For example, a date found on a document image that is statistically similar to government-issued photo IDs may be classified as the applicant's date of birth, the document's issue date, or the document's expiration date. An example embodiment can perform statistical classifications based on considering factors such as: 1) the time difference of each date compared to each other, 2) the current date, and 3) the applicant's date of birth as listed on their transaction application. An example embodiment can classify a future date (e.g., one that exceeds the current date) as most likely to be the document's expiration date. An example embodiment can classify the date that is identical to what the applicant specified as their date of birth as a birth date. An example embodiment can classify the date between the applicant's date of birth and the document's expiration date as most likely to be the document's issue date. Alternatively, dates extracted from a document image that is statistically similar to a retail installment sales contract may be classified as the date when a portion of the contract was agreed to, the date when the first payment is due, or the date when the final payment is due. As yet another example, dates extracted from a document image that are statistically similar to a paystub may be classified as the pay period's begin date, the pay period's end date, the date when the applicant was paid, the date when the applicant began employment, the date when the document was printed, etc.

Figure 8:
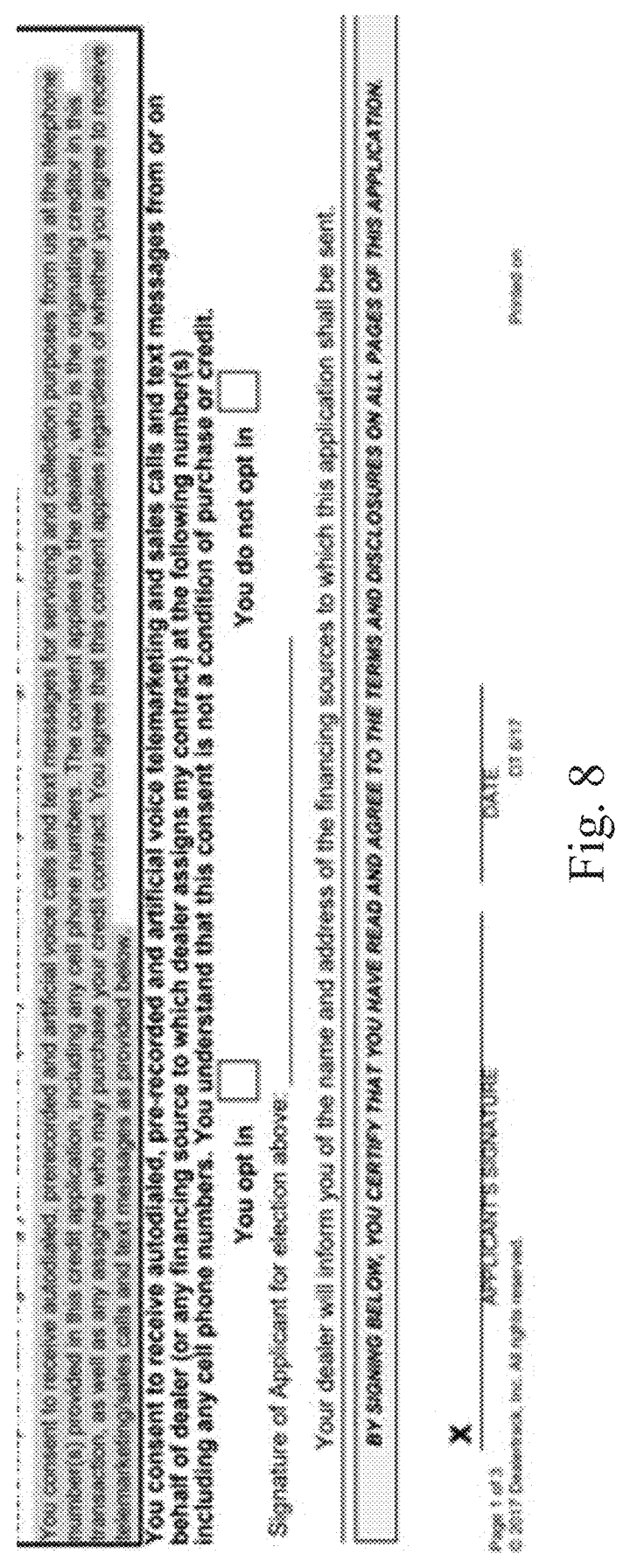

An example embodiment can also classify text and features of documents based on their legal implications. For example, extracted text pertaining to commonly classified consents, waivers, notices, disclaimers, or clauses may be used to automate consumer contact, access the consumer's credit report, initiate a verification of employment, trigger marketing solicitations, and/or adjust the prioritization of resources. Referring to FIG. 8, the presence of the sample illustrated language or text in a credit application document/image, paired with a date and a signature closely resembling what is found on a government-issued photo ID matching the applicant's name, is used by the example embodiment to indicate that the applicant's phone number listed on their credit application may be sent a text message for the purpose of collecting documents/images to satisfy stipulations. As such, the example embodiment can automatically obtain applicant consents and waivers based on the document analysis as described above. This consent and/or waiver language permits the dealer and/or the lender to text message the applicant to collect the remaining required stipulation documents to commence servicing of the loan.

Figure 9:
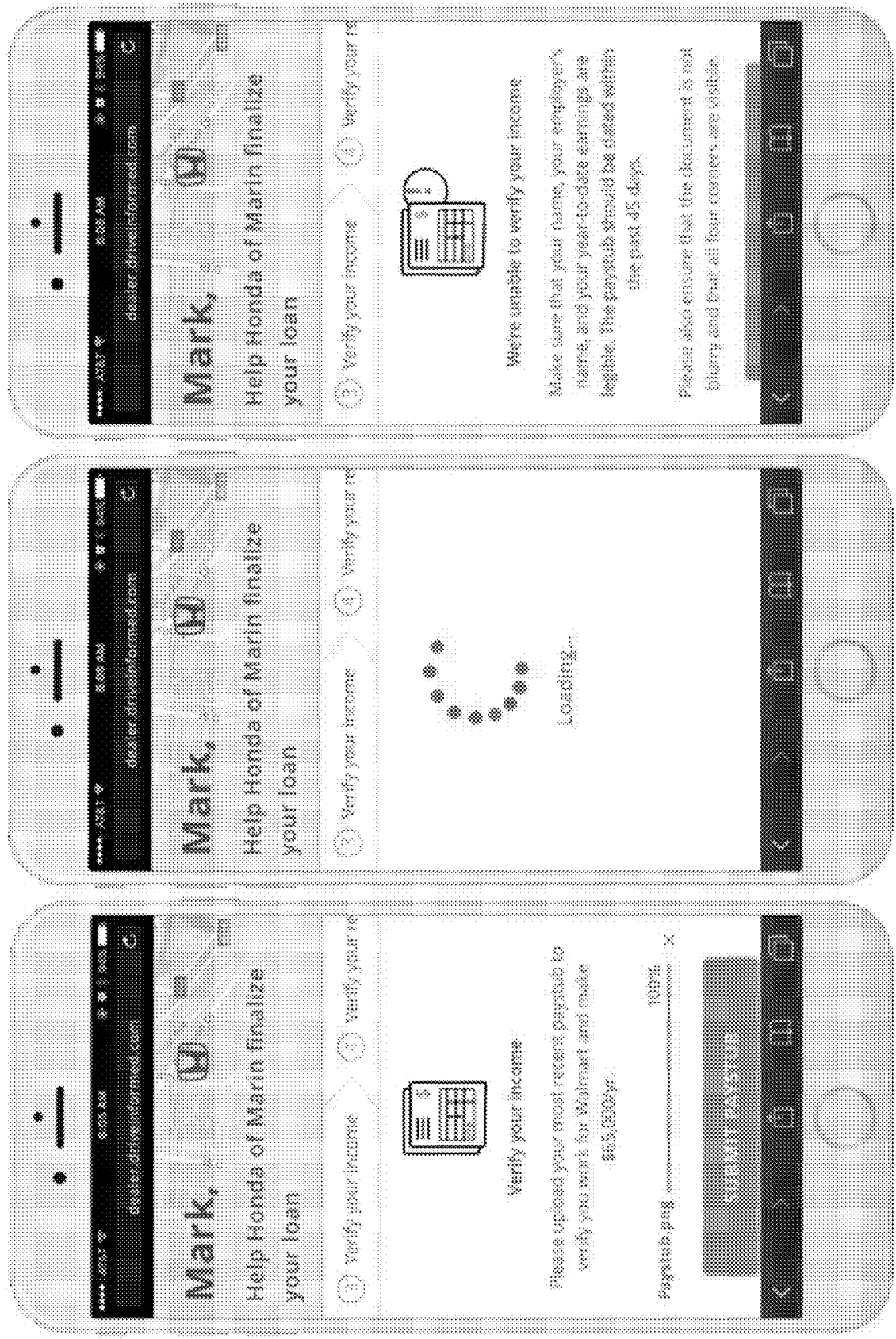
FIG. 9 illustrates an example embodiment to identify and surface discrepancies and/or deficiencies found in stipulation documents that may prevent the stipulation documents from satisfying required stipulations as soon as they are uploaded.

Referring to FIG. 9, an example embodiment provides a system and method to identify and surface discrepancies and/or deficiencies found in stipulation documents that may prevent the stipulation documents from satisfying required stipulations as soon as they are uploaded. An example embodiment can statistically classify the uploaded document/image as a particular type of document as described above. Once the document type is determined, the example embodiment can compare the document type with the requested stipulation document. If the uploaded document/image is of a different type than what was requested (based on statistical analysis of the document features), the example embodiment can immediately generate and display an error message to the applicant via the applicant platform 130 before the document/image is submitted to the dealer and/or lender. For example, if an applicant, a dealer, and/or a lender personnel is prompted to snap pictures and upload a paystub, but the applicant uploads a bank statement instead, the example embodiment can detect this discrepancy and generate for display an error message. If the document/image uploaded by the individual is of the same type as what was requested (based on statistical analysis of features), the example embodiment can also determine if certain expected features of the uploaded document are missing or are not statistically similar to information from the transaction application. If this discrepancy is detected, the example embodiment can generate and display an error message to the individual via the applicant platform 130 before the document/image is submitted to the dealer and/or lender. For example, applicants who upload a paystub when prompted to do so may still receive an error message if: 1) the paystub document/image does not reference the applicant's name or may reference a different applicant's name (for example, "Jo Boren Sr." rather than "Jo Boren"), 2) the paystub document/image specifies a pay date that is not recent (for example, more than 45 days may have elapsed between the date when the transaction application was approved and when the paystub was dated), 3) the earnings stated in the paystub document/image do not support or are not consistent with the applicant's gross annual income, 4) the paystub was issued by an employer that is different from what the applicant specified in their transaction application, or 5) the paystub shares features that are statistically similar to those found in fraudulent paystubs (for example, alignments, spacing, typos, calculations, logos, watermarks, and layouts on the paystub are statistically similar to those from paystubs deemed to be fraudulent).

Figure 10:
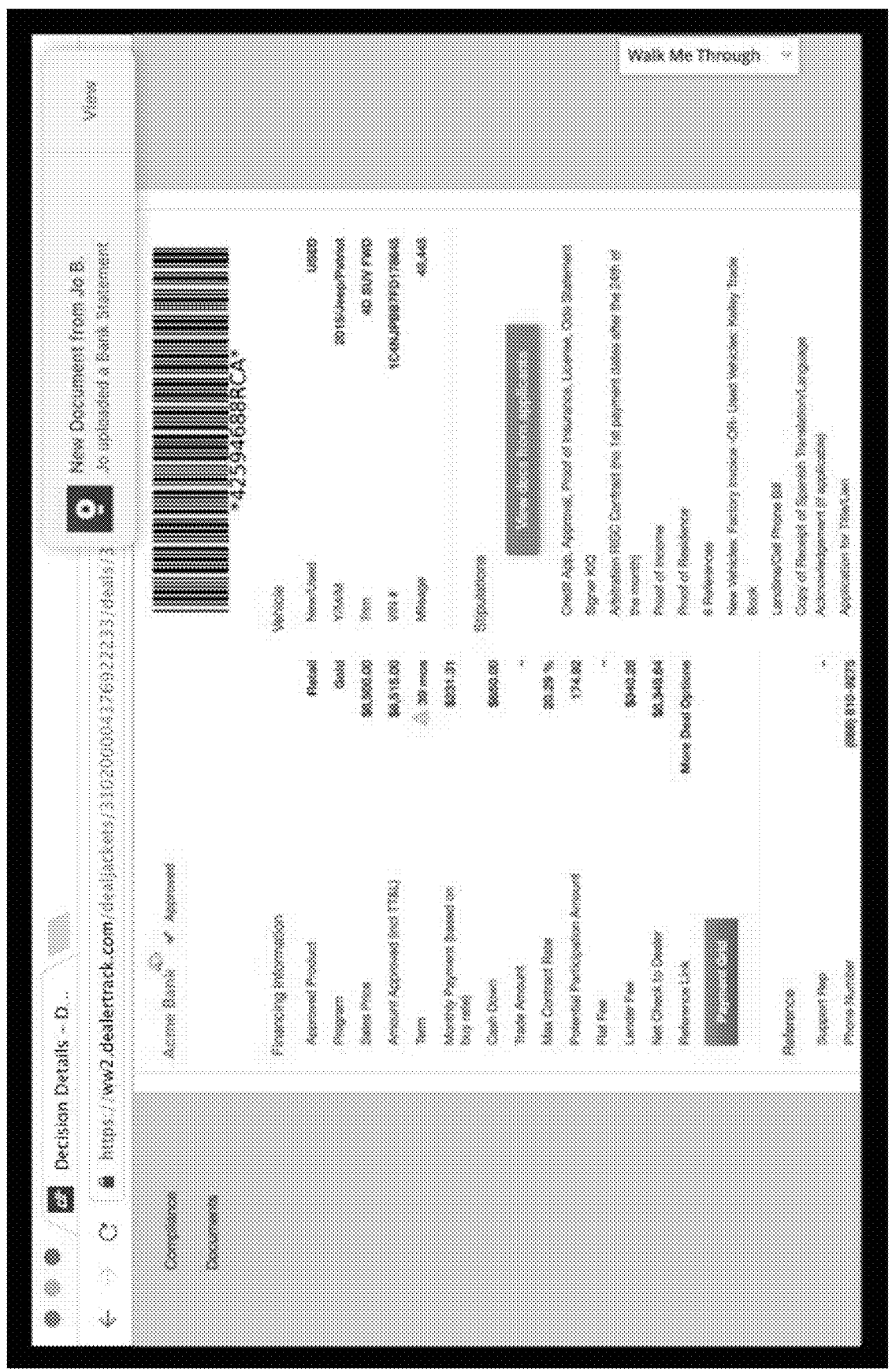
FIGS. 10 and 11 illustrate example embodiments that enable the secure handling and transfer of stipulation documents/images uploaded to the dealer or lender at a dealer/lender platform via the host site.
Figure 11:
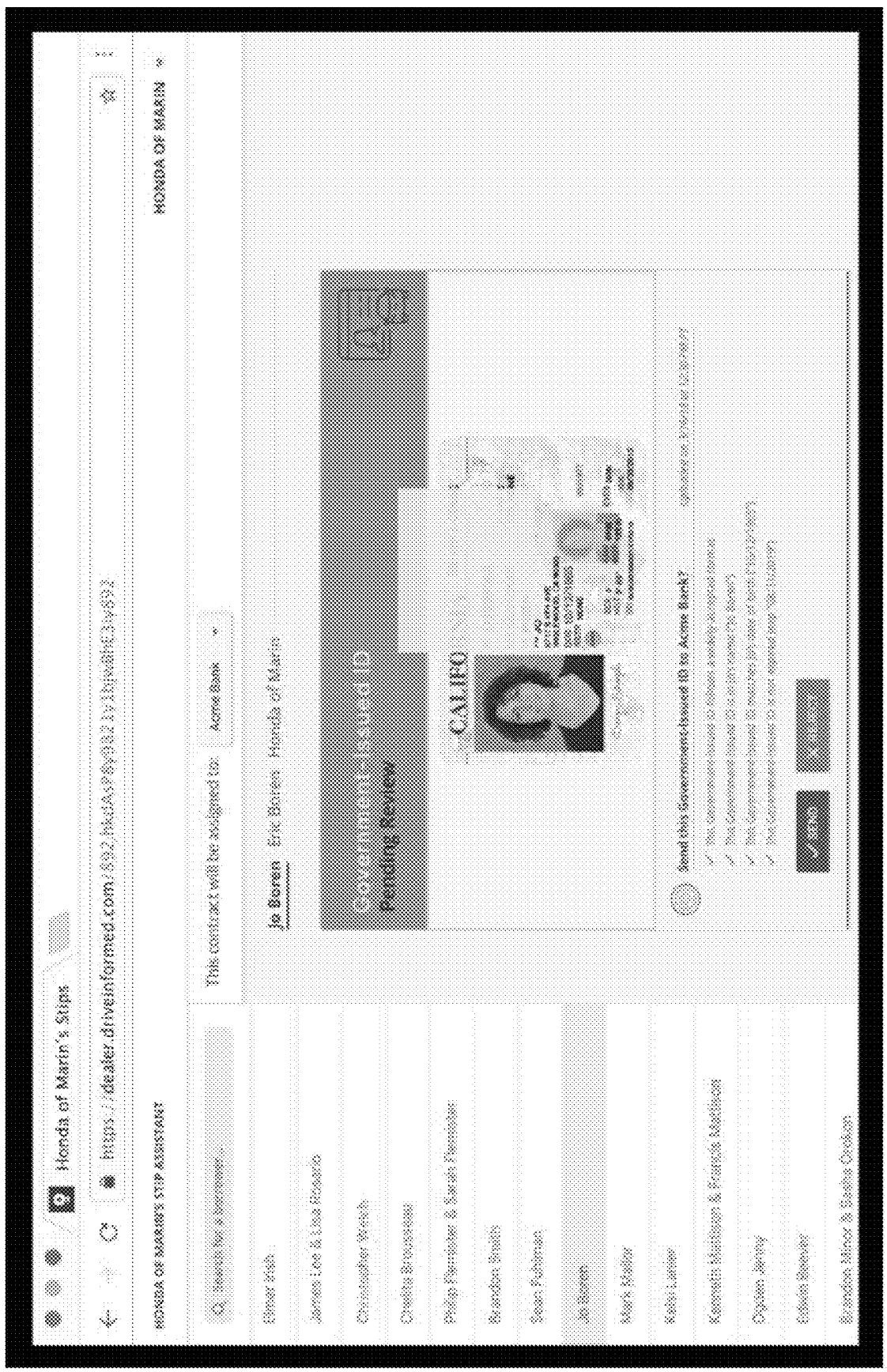
Figure 12:
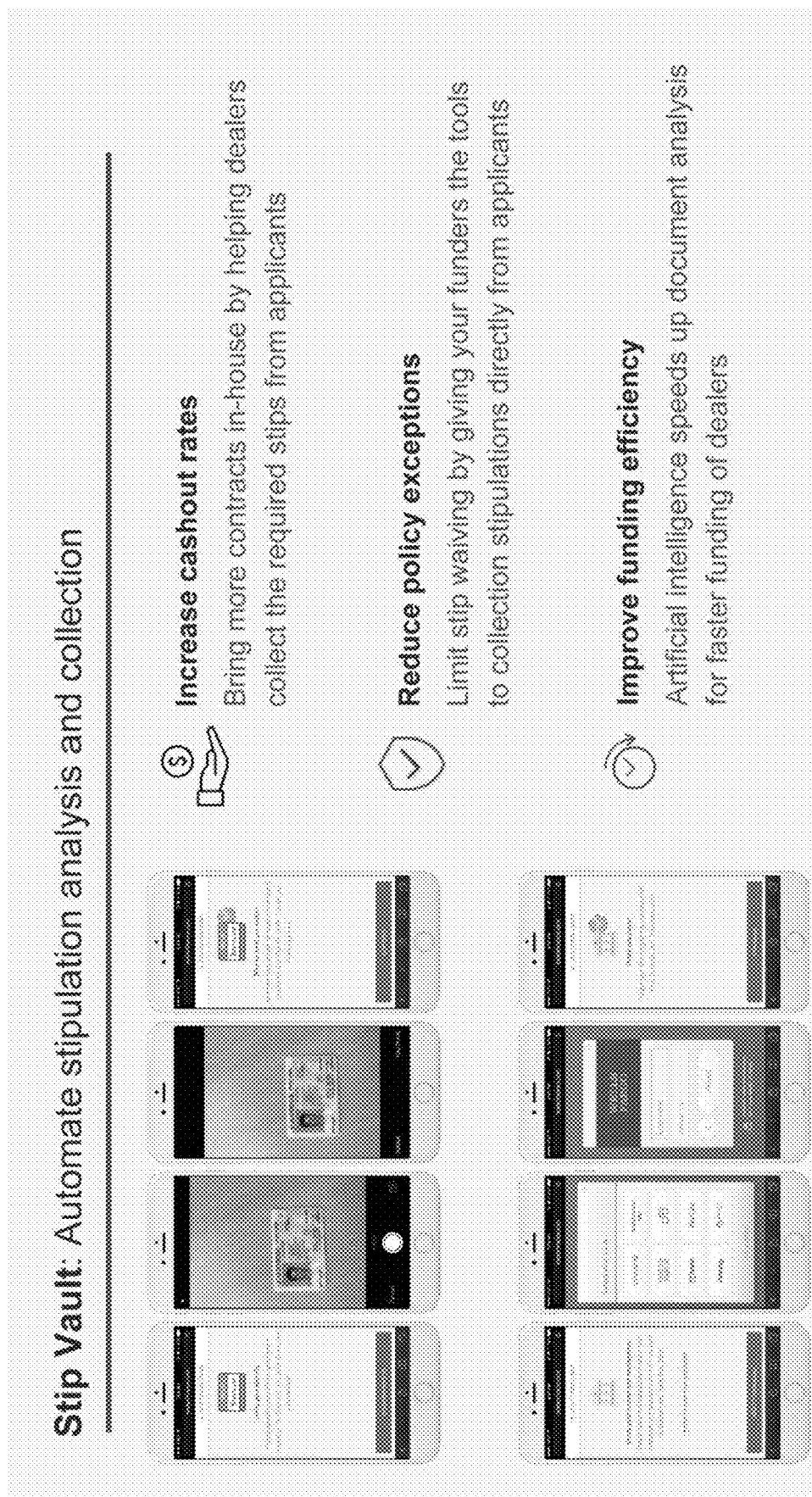
FIGS. 12 through 22 illustrate additional examples of the features, processing, and user interface provided by various example embodiments.
Figure 13:
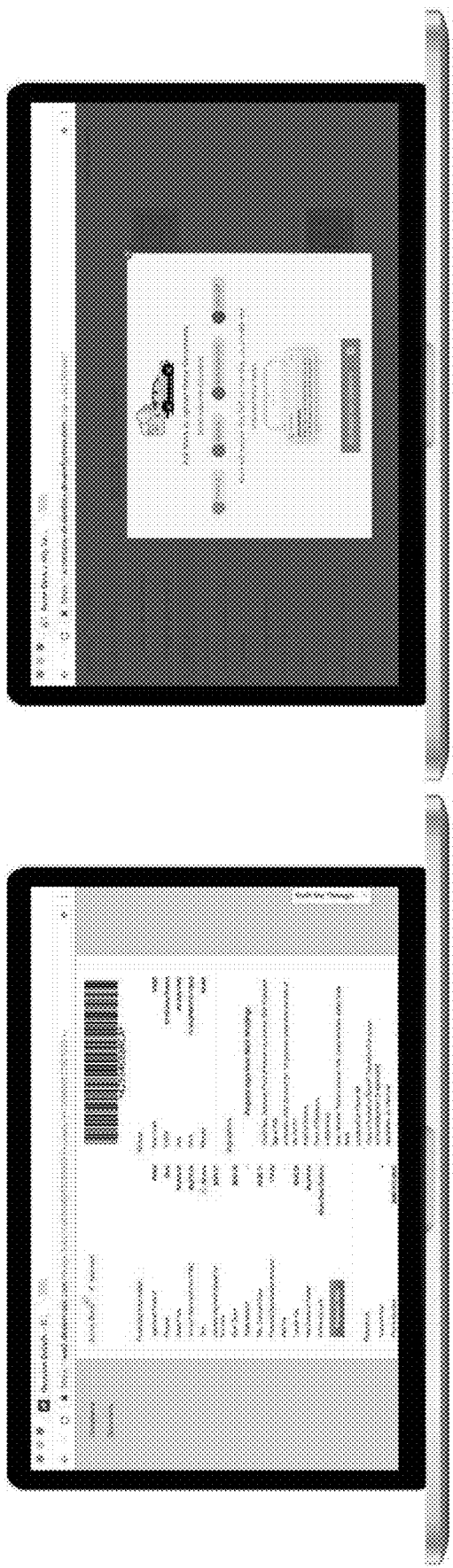
Figure 14:
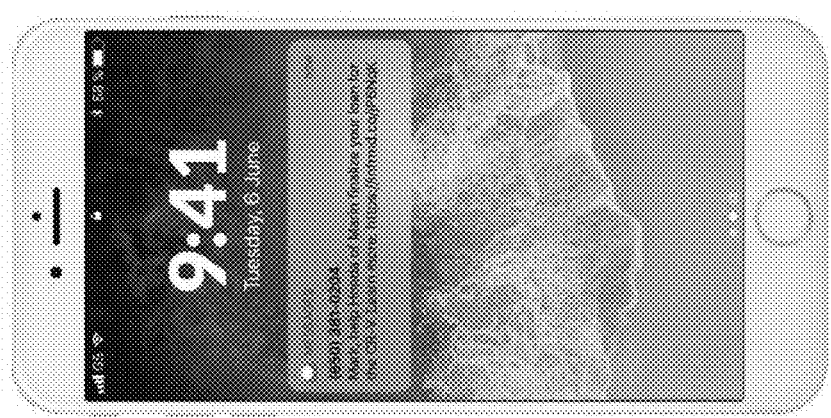
Figure 15:
Figure 16:
Figure 17:
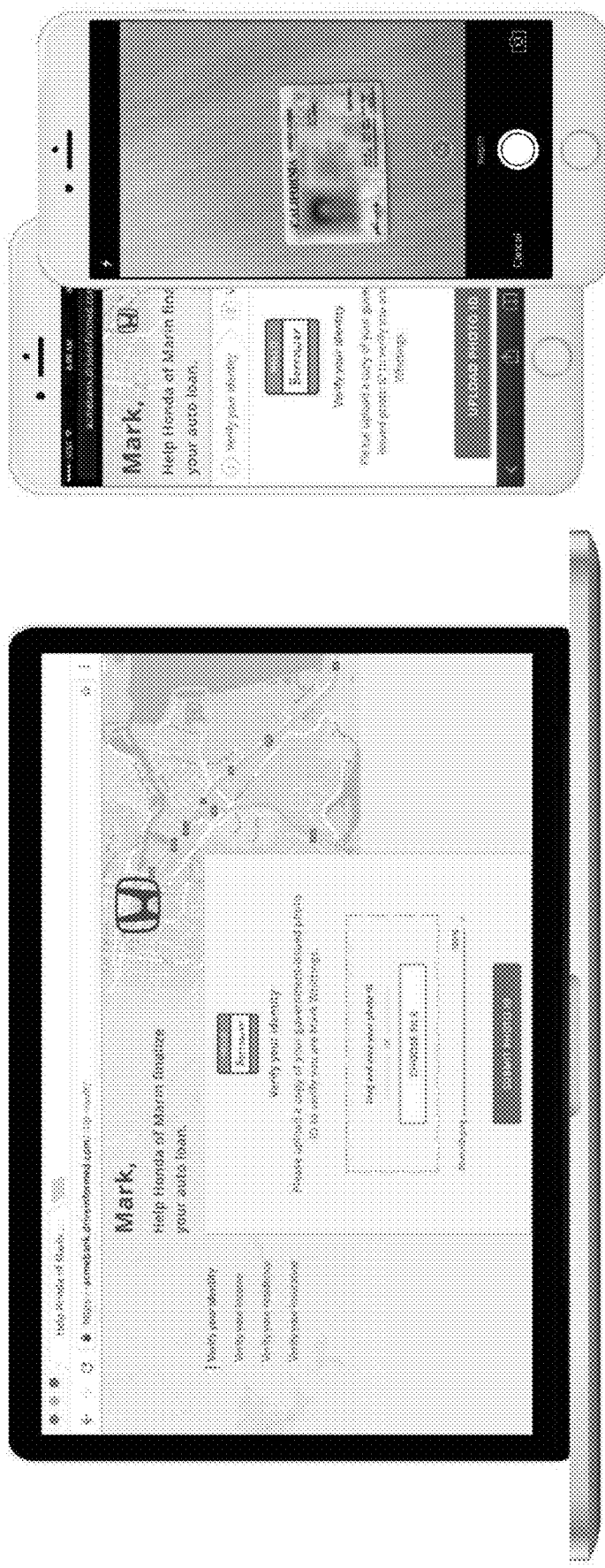
Figure 18:
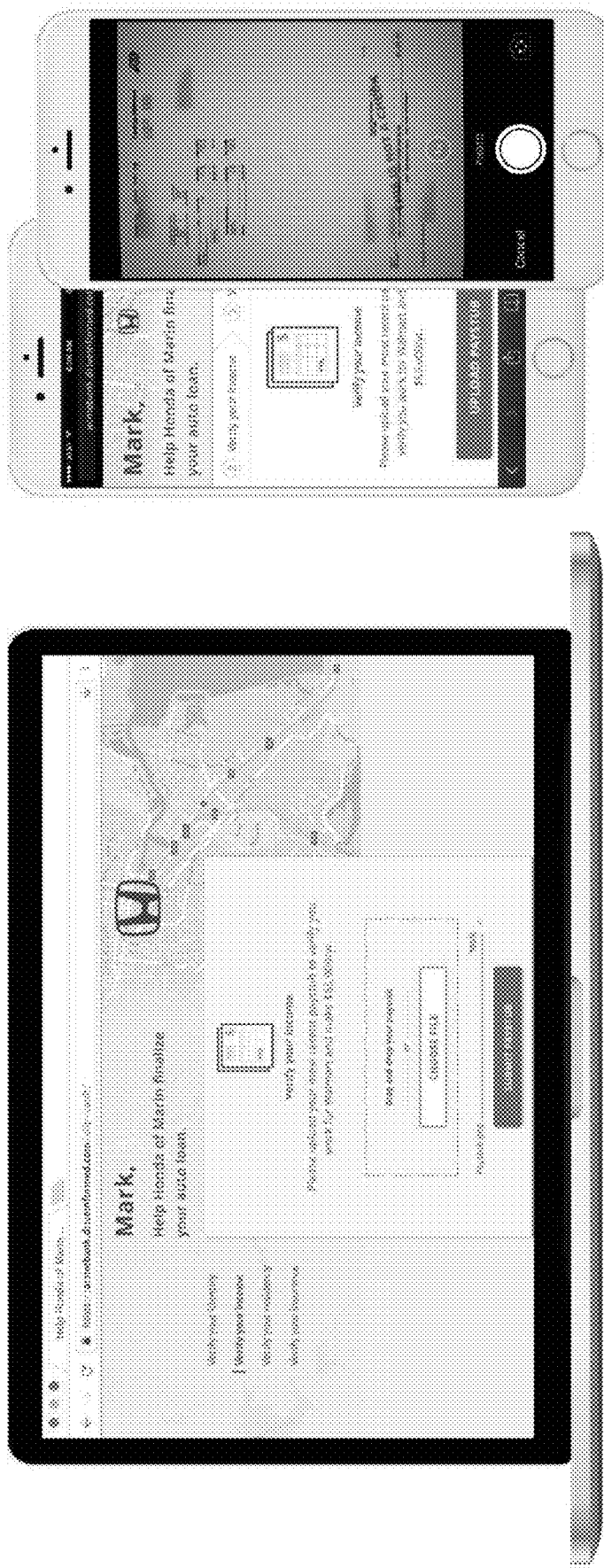
Figure 19:
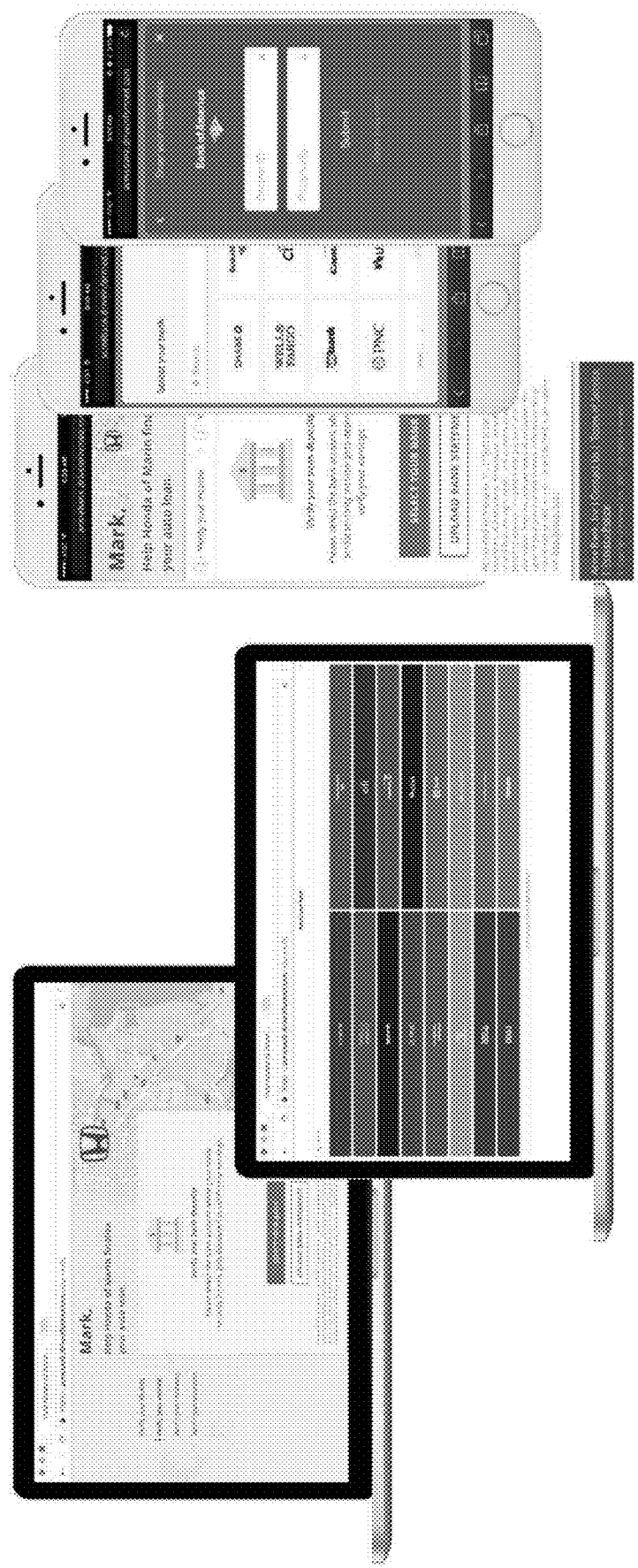
Figure 20:
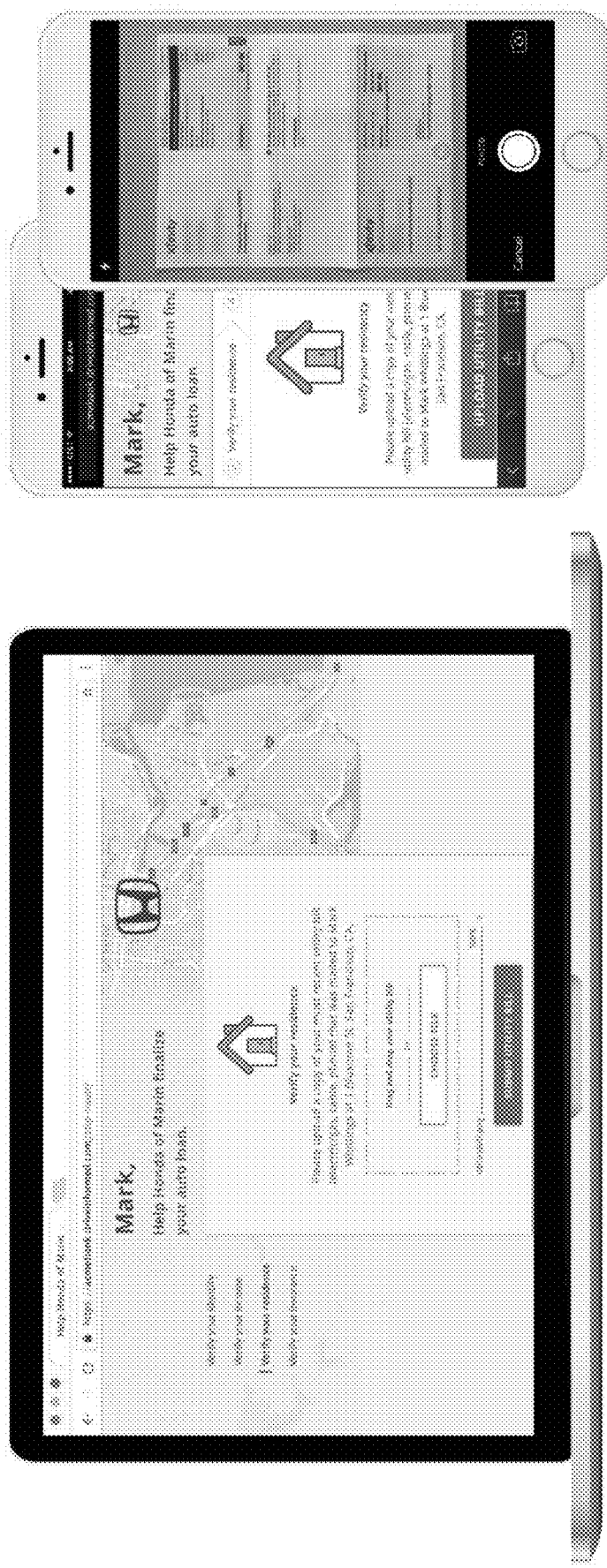
Figure 21:
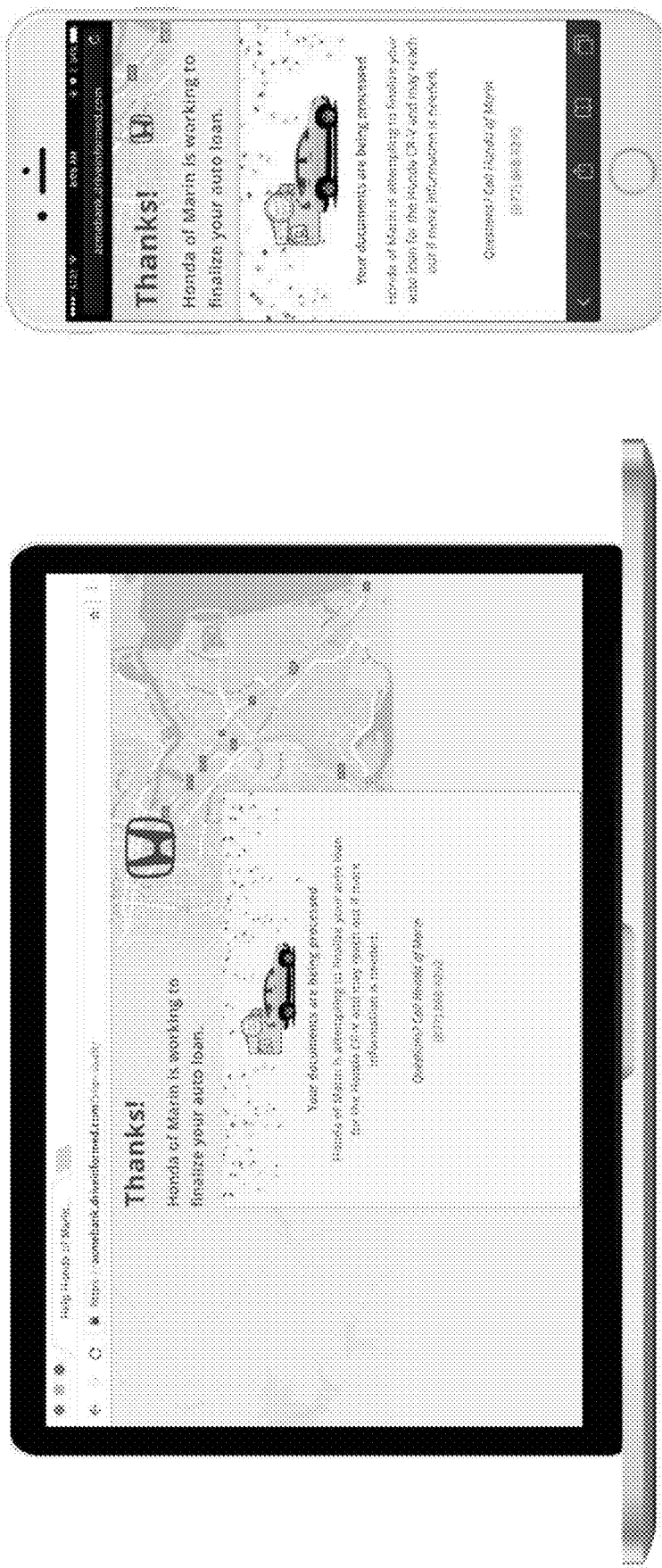
Figure 22:
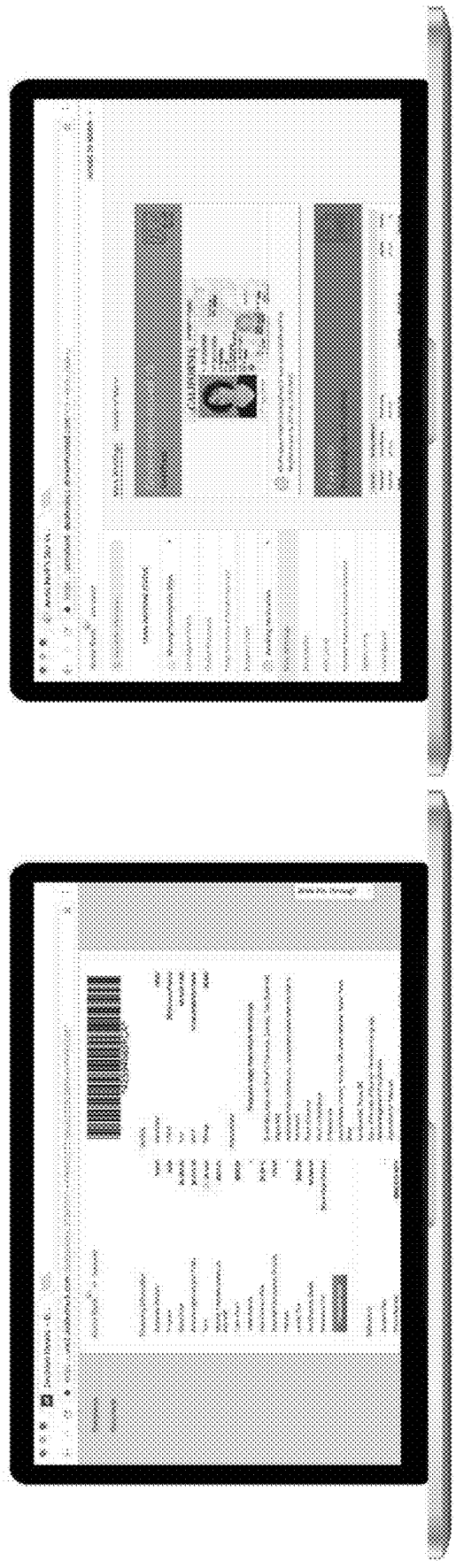

Referring to FIGS. 10 and 11, an example embodiment provides a system and method to enable the secure handling and transfer of stipulation documents/images uploaded to the dealer or lender at a dealer/lender platform 120 (or computing system that the dealer and/or lender contracts with) via the host site 110. Additionally, the example embodiment provides a system and method to enable the secure handling and transfer of information extracted from the uploaded stipulation documents for the purpose of evaluating whether or not to complete a transaction (e.g., fund a loan). The secure transfer of stipulation documents/images and the extracted information can be implemented using network protocols such as HTTP, FTP, SMTP, etc. whereby information, that may be encrypted using SSL/TLS, is exchanged in a variety of formats (including, but not limited to, XML and JSON formats). FIGS. 10 and 11 show examples of the format used by an example embodiment to transfer documents/images, along with extracted information pertaining to the documents/images, back to the dealer or lender at a dealer/lender platform 120 via the host site 110 for indirect and direct transactions (e.g., auto lending). The example embodiments can also be configured to notify the dealer and/or lender that a stipulation document has been uploaded by an applicant that is likely to satisfy a stipulation for a particular transaction.

Referring to FIGS. 12 through 22, additional examples illustrate the features, processing, and user interfaces provided by various example embodiments.

Figure 23:
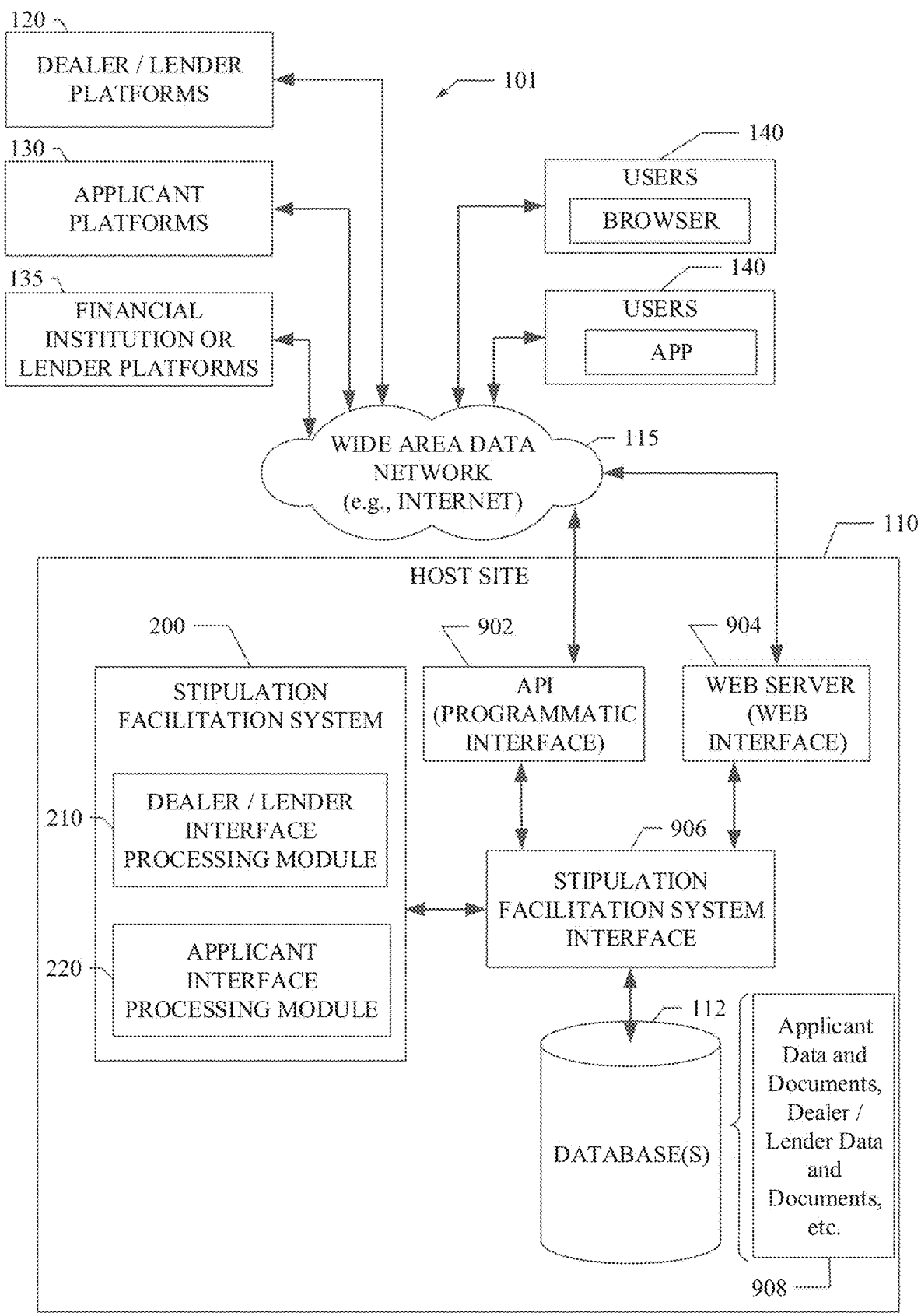
FIG. 23 illustrates another example embodiment of a networked system in which various embodiments may operate.

Referring now to FIG. 23, another example embodiment 101 of a networked system in which various embodiments may operate is illustrated. In the embodiment illustrated, the host site 110 is shown to include the stipulation facilitation system 200. The stipulation facilitation system 200 is shown to include the dealer/lender interface processing module 210 and the applicant interface processing module 220, as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the stipulation facilitation system 200 either directly or via an interface 906. The stipulation facilitation system 200 may be configured to access a data storage device 112 either directly or via the interface 906.

Figure 24:
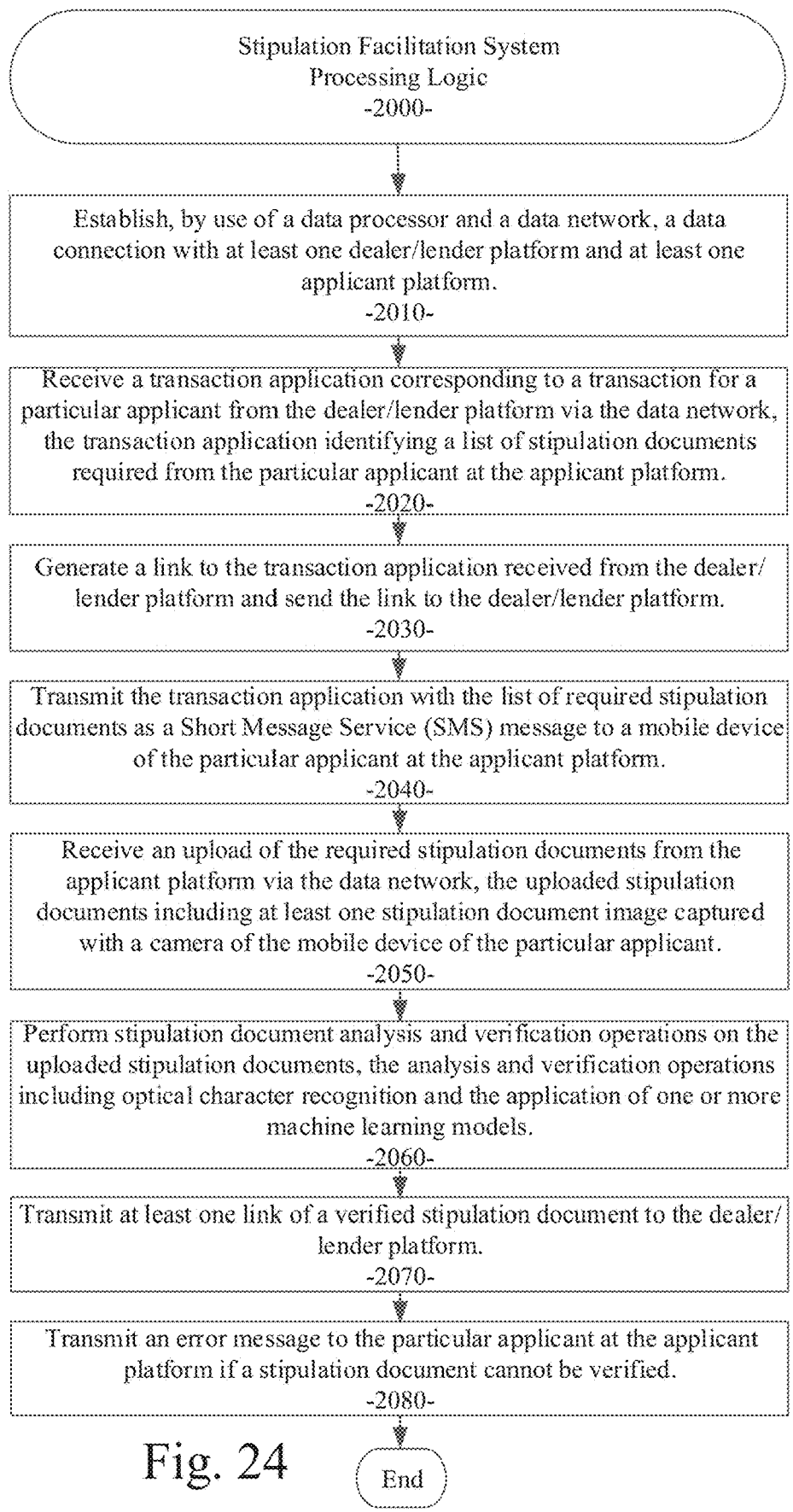
FIG. 24 illustrates a processing flow diagram that illustrates an example embodiment of a method as described herein.

Referring now to FIG. 24, a processing flow diagram illustrates an example embodiment of a method implemented by the stipulation facilitation system 200 as described herein. The method 2000 of an example embodiment includes: establishing, by use of a data processor and a data network, a data connection with at least one dealer/lender platform and at least one applicant platform (processing block 2010); receiving a transaction application corresponding to a transaction for a particular applicant from the dealer/lender platform via the data network, the transaction application identifying a list of stipulation documents required from the particular applicant at the applicant platform (processing block 2020); generating a link to the transaction application received from the dealer/lender platform and sending the link to the dealer/lender platform (processing block 2030); transmitting the transaction application with the list of required stipulation documents as a Short Message Service (SMS) message to a mobile device of the particular applicant at the applicant platform (processing block 2040); receiving an upload of the required stipulation documents from the applicant platform via the data network, the uploaded stipulation documents including at least one stipulation document image captured with a camera of the mobile device of the particular applicant (processing block 2050); performing stipulation document analysis and verification operations on the uploaded stipulation documents, the analysis and verification operations including optical character recognition and the application of one or more machine learning models (processing block 2060); transmitting at least one link of a verified stipulation document to the dealer/lender platform (processing block 2070); and transmitting an error message to the particular applicant at the applicant platform if a stipulation document cannot be verified (processing block 2080).

Figure 25:
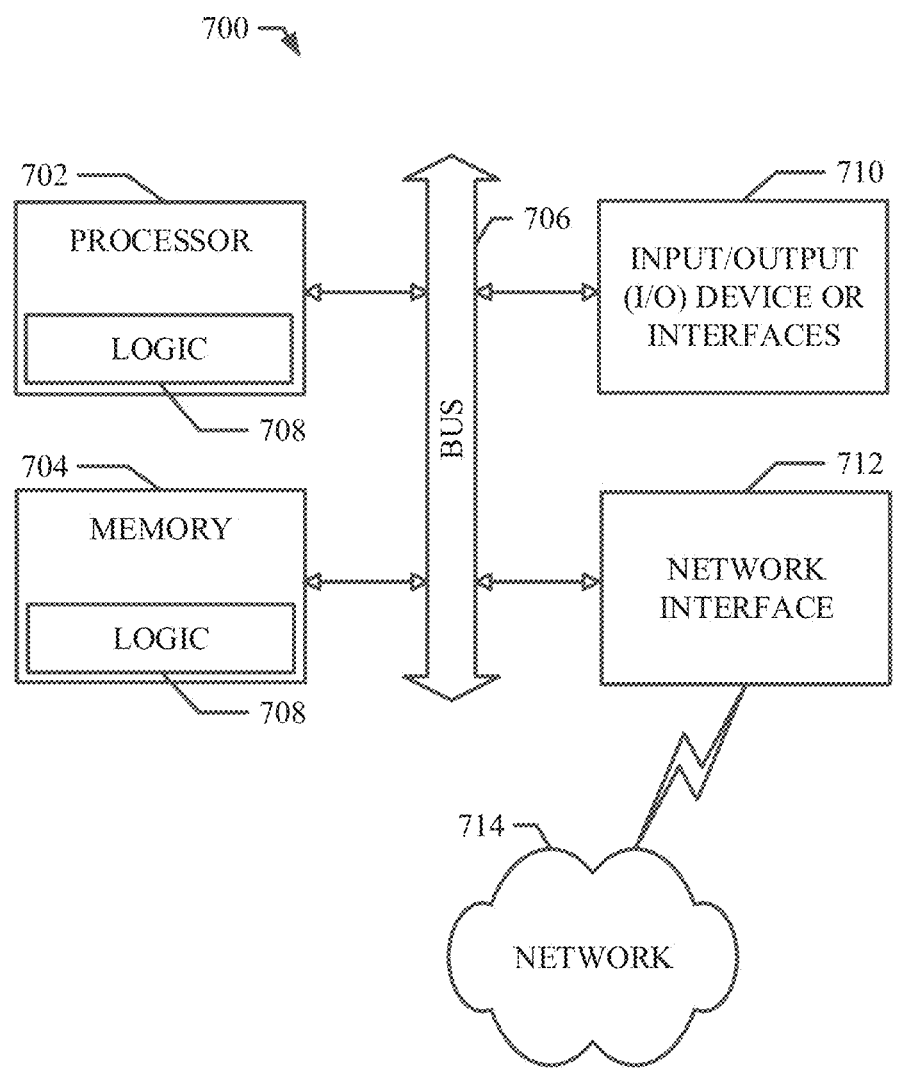
FIG. 25 shows a diagrammatic representation of a machine in the example form of a computer system within which a set of instructions when executed may cause the machine to perform any one or more of the methodologies discussed herein.

FIG. 25 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a mobile device, a web appliance, a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that stores the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

As described herein for various example embodiments, a system and method for stipulation collection using a Short Message Service (SMS) and mobile device cameras with real-time analysis of documents are disclosed. In the various example embodiments described herein, a computer-implemented tool or software application (app) as part of a stipulation facilitation system is described to automate and improve the collection and verification of stipulations between parties in a transaction. In an example embodiment, documents are immediately analyzed using machine learning techniques to provide real-time feedback to the applicant who snapped photos of or uploaded documents regarding deficiencies that prevent the stipulation from being satisfied. In various example embodiments described herein, the stipulation facilitation system provides a document collection and verification system as it relates to the consumer finance industry, specifically, to indirect and direct auto lending. Indirect auto loan applicants and dealer personnel to date have not been able to take advantage of SMS capabilities that allow for secure Web links to be delivered to mobile devices (e.g., mobile phones) so that parties to a transaction can use the cameras on their mobile devices to upload documents and get near real-time feedback on issues that could delay the lender from accepting the document. As such, the various embodiments as described herein are necessarily rooted in computer and network technology and serve to improve these technologies when applied in the manner as presently claimed. In particular, the various embodiments described herein improve the use of mobile device technology and data network technology in the context of product purchase and financing transactions via electronic means.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
   establishing, by use of a data processor and a data network, a data connection with at least one dealer/lender platform and at least one applicant platform;
   receiving a transaction application corresponding to a transaction for a particular applicant from the dealer/lender platform via the data network, the transaction application identifying a list of stipulation documents required from the particular applicant at the applicant platform;
   generating a link to the transaction application received from the dealer/lender platform and sending the link to the dealer/lender platform;
   transmitting the transaction application with the list of required stipulation documents as a Short Message Service (SMS) message to a mobile device of the particular applicant at the applicant platform;
   receiving an upload of the required stipulation documents from the applicant platform via the data network, the uploaded stipulation documents including at least one stipulation document image captured with a camera of the mobile device of the particular applicant;
   performing stipulation document analysis and verification operations on the uploaded stipulation documents, the analysis and verification operations including optical character recognition and the application of one or more machine learning models;
   transmitting at least one link of a verified stipulation document to the dealer/lender platform; and
   transmitting an error message to the particular applicant at the applicant platform if a stipulation document cannot be verified.

2. The method of claim 1 further including periodically sending reminders to the particular applicant as one or more SMS messages.

3. The method of claim 1 further including ensuring that the particular applicant only receives SMS messages initiated from the dealer/lender platform at certain hours of the day as defined in terms of the particular applicant's local time.

4. The method of claim 1 further including transmitting a personalized link on behalf of a dealer and/or lender at the dealer/lender platform to the particular applicant, the personalized link enabling the particular applicant to use a web browser of their mobile device to: 1) see which stipulation documents are being requested to satisfy stipulations pertaining to the transaction, 2) use a camera on the particular applicant's mobile device to capture images of the requested stipulation documents, and 3) upload the stipulation document images via the data network.

5. The method of claim 1 wherein the stipulation documents are of a type from the group consisting of: Government-Issued Photo IDs, Paystubs, Bank Statements, Social Security Income Award Letters, Job Offer Letters, Military Leave and Earnings Statements (LES) and Retiree Account Statements (RAS), Disability Insurance Award Letters, Student Financial Aid, Utility Bills, Insurance Cards, Insurance Declaration Pages, Fronts of State-Issued Vehicle Titles, Backs of State-Issued Vehicle Titles, Fronts of State Issued Vehicle Registration Cards, Powers of Attorney, Agreements to Furnish Insurance Policies, Risk-Based Pricing Notices, Credit Score Disclosure Exception Notices, Retail Installment Sales Contracts, Closed End Motor Vehicle Leases, Authorizations To Release Payoff Information, Acknowledgements Of Rewritten Contracts, Notices To Co-Signers, Applications for Title, Odometer Statements, Buyer's Orders or Lease Orders, Foreign Language Acknowledgements, Factory Invoices, Kelley Blue Book™ Bookout Sheets, NADA™ Bookout Sheets, GAP Waiver Contracts, Vehicle Service Contracts, and Credit Life Disability Insurance Contracts.

6. The method of claim 1 wherein the stipulation document analysis and verification operations on the uploaded stipulation documents include classifying the stipulation documents as being of a particular document type with a particular document structure.

7. The method of claim 6 including using the particular document type with a particular document structure to extract structured information from the document.

8. A system comprising:
   a data processor;
   a network interface, in data communication with the data processor, for communication on a data network; and
   a stipulation facilitation system, executable by the data processor, to:
      establish, by use of the data processor and the data network, a data connection with at least one dealer/lender platform and at least one applicant platform;
      receive a transaction application corresponding to a transaction for a particular applicant from the dealer/lender platform via the data network, the transaction application identifying a list of stipulation documents required from the particular applicant at the applicant platform;
      generate a link to the transaction application received from the dealer/lender platform and send the link to the dealer/lender platform;
      transmit the transaction application with the list of required stipulation documents as a Short Message Service (SMS) message to a mobile device of the particular applicant at the applicant platform;

receive an upload of the required stipulation documents from the applicant platform via the data network, the uploaded stipulation documents including at least one stipulation document image captured with a camera of the mobile device of the particular applicant;

perform stipulation document analysis and verification operations on the uploaded stipulation documents, the analysis and verification operations including optical character recognition and the application of one or more machine learning models;

transmit at least one link of a verified stipulation document to the dealer/lender platform; and transmit an error message to the particular applicant at the applicant platform if a stipulation document cannot be verified.

9. The system of claim 8 being further configured to periodically send reminders to the particular applicant as one or more SMS messages.

10. The system of claim 8 being further configured to ensure that the particular applicant only receives SMS messages initiated from the dealer/lender platform at certain hours of the day as defined in terms of the particular applicant's local time.

11. The system of claim 8 being further configured to transmit a personalized link on behalf of a dealer and/or lender at the dealer/lender platform to the particular applicant, the personalized link enabling the particular applicant to use a web browser of their mobile device to: 1) see which stipulation documents are being requested to satisfy stipulations pertaining to the transaction, 2) use a camera on the particular applicant's mobile device to capture images of the requested stipulation documents, and 3) upload the stipulation document images via the data network.

12. The system of claim 8 wherein the stipulation documents are of a type from the group consisting of: Government-Issued Photo IDs, Paystubs, Bank Statements, Social Security Income Award Letters, Job Offer Letters, Military Leave and Earnings Statements (LES) and Retiree Account Statements (RAS), Disability Insurance Award Letters, Student Financial Aid, Utility Bills, Insurance Cards, Insurance Declaration Pages, Fronts of State-Issued Vehicle Titles, Backs of State-Issued Vehicle Titles, Fronts of State Issued Vehicle Registration Cards, Powers of Attorney, Agreements to Furnish Insurance Policies, Risk-Based Pricing Notices, Credit Score Disclosure Exception Notices, Retail Installment Sales Contracts, Closed End Motor Vehicle Leases, Authorizations To Release Payoff Information, Acknowledgements Of Rewritten Contracts, Notices To Co-Signers, Applications for Title, Odometer Statements, Buyer's Orders or Lease Orders, Foreign Language Acknowledgements, Factory Invoices, Kelley Blue Book™ Bookout Sheets, NADA™ Bookout Sheets, GAP Waiver Contracts, Vehicle Service Contracts, and Credit Life Disability Insurance Contracts.

13. The system of claim 8 wherein the stipulation document analysis and verification operations on the uploaded stipulation documents being further configured to classify the stipulation documents as being of a particular document type with a particular document structure.

14. The system of claim 13 being further configured to use the particular document type with a particular document structure to extract structured information from the document.

15. A non-transitory machine-readable storage medium embodying instructions which, when executed by a machine, cause the machine to:

establish, by use of a data processor and a data network, a data connection with at least one dealer/lender platform and at least one applicant platform;

receive a transaction application corresponding to a transaction for a particular applicant from the dealer/lender platform via the data network, the transaction application identifying a list of stipulation documents required from the particular applicant at the applicant platform;

generate a link to the transaction application received from the dealer/lender platform and send the link to the dealer/lender platform;

transmit the transaction application with the list of required stipulation documents as a Short Message Service (SMS) message to a mobile device of the particular applicant at the applicant platform;

receive an upload of the required stipulation documents from the applicant platform via the data network, the uploaded stipulation documents including at least one stipulation document image captured with a camera of the mobile device of the particular applicant;

perform stipulation document analysis and verification operations on the uploaded stipulation documents, the analysis and verification operations including optical character recognition and the application of one or more machine learning models;

transmit at least one link of a verified stipulation document to the dealer/lender platform; and transmit an error message to the particular applicant at the applicant platform if a stipulation document cannot be verified.

16. The non-transitory machine-readable storage medium of claim 15 being further configured to periodically send reminders to the particular applicant as one or more SMS messages.

17. The non-transitory machine-readable storage medium of claim 15 being further configured to ensure that the particular applicant only receives SMS messages initiated from the dealer/lender platform at certain hours of the day as defined in terms of the particular applicant's local time.

18. The non-transitory machine-readable storage medium of claim 15 being further configured to transmit a personalized link on behalf of a dealer and/or lender at the dealer/lender platform to the particular applicant, the personalized link enabling the particular applicant to use a web browser of their mobile device to: 1) see which stipulation documents are being requested to satisfy stipulations pertaining to the transaction, 2) use a camera on the particular applicant's mobile device to capture images of the requested stipulation documents, and 3) upload the stipulation document images via the data network.

19. The non-transitory machine-readable storage medium of claim 15 wherein the stipulation documents are of a type from the group consisting of: Government-Issued Photo IDs, Paystubs, Bank Statements, Social Security Income Award Letters, Job Offer Letters, Military Leave and Earnings Statements (LES) and Retiree Account Statements (RAS), Disability Insurance Award Letters, Student Financial Aid, Utility Bills, Insurance Cards, Insurance Declaration Pages, Fronts of State-Issued Vehicle Titles, Backs of State-Issued Vehicle Titles, Fronts of State Issued Vehicle Registration Cards, Powers of Attorney, Agreements to Furnish Insurance Policies, Risk-Based Pricing Notices, Credit Score Disclosure Exception Notices, Retail Installment Sales Contracts, Closed End Motor Vehicle Leases, Authorizations To Release Payoff Information, Acknowledgements Of Rewritten Contracts, Notices To Co-Signers, Applications for Title, Odometer Statements, Buyer's Orders or Lease Orders, Foreign Language Acknowledgements, Factory Invoices, Kelley Blue Book™ Bookout Sheets, NADA™ Bookout Sheets, GAP Waiver Contracts, Vehicle Service Contracts, and Credit Life Disability Insurance Contracts.

20. The non-transitory machine-readable storage medium of claim 15 wherein the stipulation document analysis and verification operations on the uploaded stipulation documents being further configured to classify the stipulation documents as being of a particular document type with a particular document structure.

\* \* \* \* \*